United States Patent [19]
Ricca

[11] Patent Number: 5,329,204
[45] Date of Patent: Jul. 12, 1994

[54] ATTACHMENT FOR AUTOMATIC LIGHT SWITCHING

[76] Inventor: Tom L. Ricca, 1413 Wyandotte Rd., Columbus, Ohio 43212

[21] Appl. No.: 849,109

[22] Filed: Mar. 9, 1992

[51] Int. Cl.$^5$ .............................................. B60Q 1/34
[52] U.S. Cl. ..................................... 315/82; 315/307; 307/10.8
[58] Field of Search ...................... 315/83, 82, 77, 307; 307/10.8

[56] References Cited

U.S. PATENT DOCUMENTS

| | | | |
|---|---|---|---|
| 3,544,838 | 12/1970 | Carruth | 315/83 |
| 3,684,916 | 8/1972 | Skinner | 315/82 |
| 3,909,661 | 9/1975 | Grossenbacher | 315/82 |
| 4,301,390 | 11/1981 | Earle | 315/82 |
| 4,306,158 | 12/1981 | Ogle | 315/82 |
| 4,866,345 | 9/1989 | Kataoka | 307/10.8 |
| 4,965,461 | 10/1990 | McRoberts, Jr. et al. | 315/83 |

FOREIGN PATENT DOCUMENTS 71242 4/1986 Japan ....................................... 315/83

Primary Examiner—Robert J. Pascal
Assistant Examiner—Michael B. Shingleton

[57] ABSTRACT

The present invention relates to a vehicle light control circuit having a microcontroller. The novelty rests in obtaining the information on the different positions of the main light switch by sensing the change in voltage at a predetermined end of each of the sensing resistors of predetermined values connected across the terminals of a number of controlled switches which are inserted in series with the light circuits at physical locations predetermined to be convenient for the installation of the invention on each vehicle. This novelty makes it easy to provide many beneficial operations in turning off with different delays the head lights, park lights, and dome lights, as well as to provide automatic battery protection against any routinely used lights when they are inadvertently left on, without using any confusing additional switches as in prior art.

13 Claims, 19 Drawing Sheets

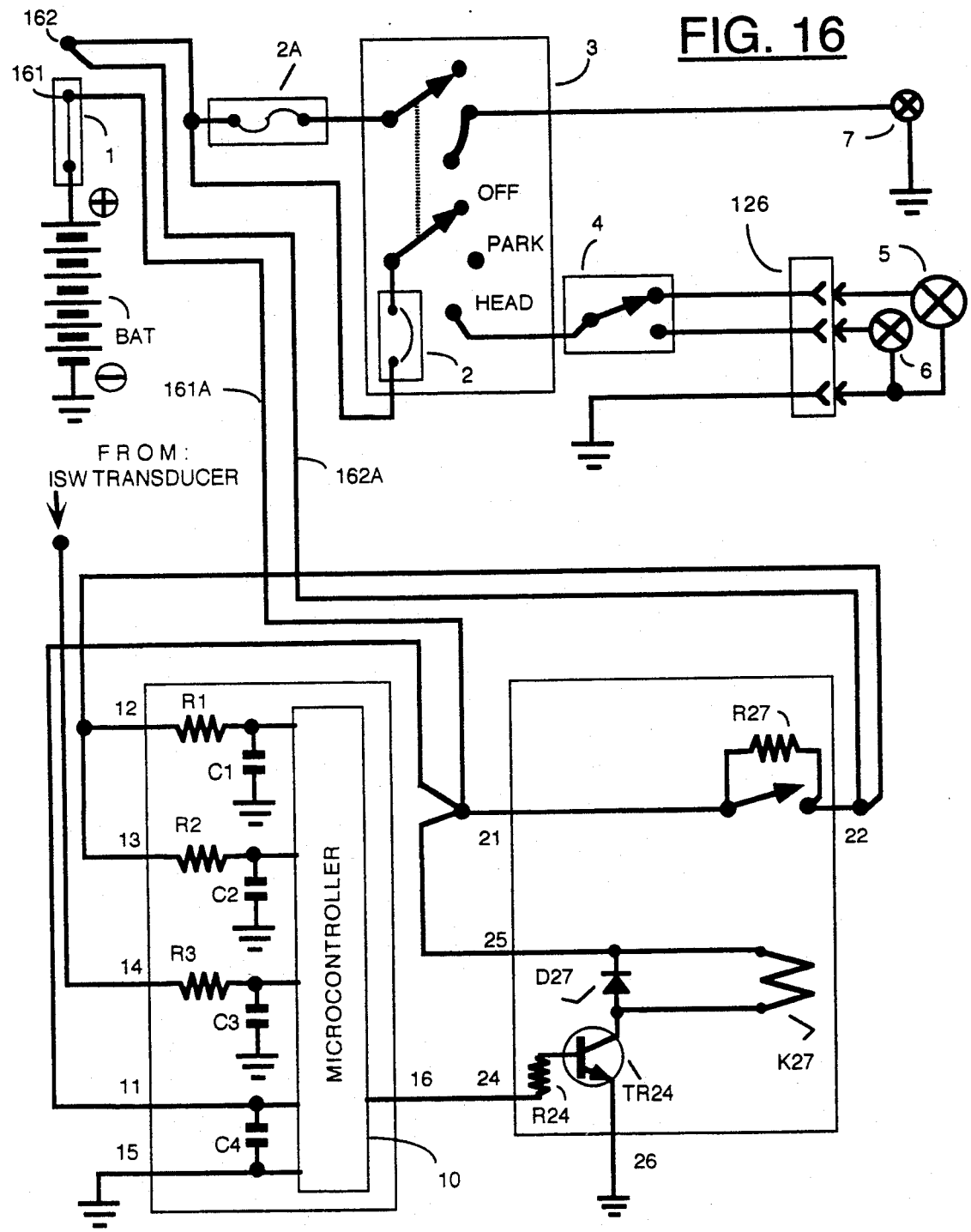

ATTACHMENT FOR AUTOMATIC LIGHT SWITCHING

BACKGROUND OF THE INVENTION

This invention relates to a novel and improved attachment adaptable to the majority of vehicles to assist the users of said vehicles in turning on and off the different sets of lights of said vehicles in a logical and friendly way.

For the intelligence of the following description, an improved vehicle or vehicle would consistently refer to one of the general classes of automobiles characterized by a car, a truck, a van and a recreational vehicle, thereon this invention is attached. Also, when this invention is not yet attached thereon, such an automobile would be referred to consistently as a car. An automobile or auto would refer consistently to either such a vehicle or such a car in an indefinite way. Finally, a user of a vehicle or a car may be a man or a woman, but would consistently be referred to as a man.

This invention will show that the operation of an improved vehicle is logical thanks to the fact that all the conventional operations related to the different light switches thereof would be strictly preserved to operate the ways the users are familiar with. Those switches, including the main light switch, the dimmer switch and the flash switch (commercially called a flash-to-pass switch, described in details later on) widely adopted by the auto industries and available in each automobile to the user, would operate the ways they have been intended for in an improved vehicle, as if there were no modifications whatsoever for the need of the invention. The additional desirable benefits provided by an improved vehicle would automatically go into action at the fight time without the user having to take any extra steps to manipulate any extra switches that may confuse any user unfamiliar with the vehicle. An improved vehicle would be friendly because it would faithfully protect its user against the frequent annoyance of having to make sure that all the lights of his vehicle are off before leaving said vehicle unattended for a long time. Such frequent annoyance, when a car is not yet equipped with this invention, occurs for example when said car's user, after parking said car for the day and walking a good distance on the way to work, suddenly becomes anxious because of something like the sight of an automobile with the head lights on for instance, about whether any lights of his car are still on. More often than not, he grudgingly would have to turn around and walk back to a point from where the lights of his car can be surely verified to be off, before he could have the peace of mind for the day. The penalty for not doing such verification could be a heavy toll of anxiety on his mind throughout the whole day, or worse still, if said car's lights were left on when it was parked for the day, said user would come back to a car that usually would not start, as most of the energy of the battery of said car had been drained off to unusable conditions in a few hours before. Time-consuming assistance would be needed for said car to start then and to regenerate enough energy for the next starting again. Although many cars nowadays have a chime system that would sound when the driver-side door is opened and any external lights of the cars are still on, many users with busy mind tend to pay little attention to that chime at the very brief moment between the opening and the closing of the driver-side door. The user of an improved vehicle would have the best solution to that problem all the time, and can be sure that even if said vehicle's lights were still on the instant when said vehicle was parked for the day, this invention would automatically turn them off a relatively short moment later, e.g., a minute, after the vehicle's ignition was turned off. Moreover, a user can enjoy the classy experience of commanding his improved vehicle, in a simple and natural manner, to keep the head lights on for a short moment, say, one minute, for some helpfully needed lighting for that walk from the parking spot to the final destination, before said improved vehicle turns off all of its lights automatically for him.

Numerous inventions have been proposed to achieve the above-mentioned benefits for automobile users, but up until now, none has been considered good enough in terms of cost, logical operation and friendliness of use, to be installable universally on every car. Also, for the retrofitting market, such an invention should only require an easy, quick, safe, and fool-proof installation, so that no training on the part of the installer would be needed, except simple mechanical skills and the ability to read a brief installation guide. For the most desirable implementation for retrofitting on an automobile, such an invention should not require the cutting and splicing of any of the pre-installed wires of said automobile, and should not require the access to the contact areas of the light switch and the ignition switch of the automobile, as such cutting and splicing would be a so messy and error-prone procedure, and such access to the contact areas so difficult that not too many service people or users would like to perform.

The following examples are some of the inventions which tried to achieve the above-mentioned benefits for automobile users but failed altogether in the desirable criteria of familiarity preservation and ease of original-equipment-manufacturer installation or retrofitting installation.

U.S. Pat. No. 3,684,916, Skinner, discloses a type of head light delay turn off circuit that turns off the head lights after the ignition switch is turned off. It is clear from the teaching of this patent that this circuit may be undesirable or dangerous for many potential users as it would always turn off the head lights only after a time delay when the light switch is moved to the OFF position and the ignition key moved to the STOP mode. The users would have complete control of the turn off of the head lights only when the ignition key is in the RUN mode. This patent also requires the difficult access to the electrical terminals physically located on the light switch and the ignition switch.

U.S. Pat. No. 4,306,158, Ogle, discloses an automatic head light extinguishing switch apparatus with no delay, adapted to interfit with an existing automobile light switch member which comprises a switch means and a wiring harness forming a form of adapter for the light switch plug means. This adapter would do the assigned job correctly if there is enough room in the light switch area to accommodate it. The main features that discourage people from using this patent are that it is always difficult to access the light switch area for retrofitting, and the additional manually operable override switch that a user would have to actuate manually before any head lights can be turned on if the automobile engine is turned off.

U.S. Pat. No. 4,965,461, Mc Robert, Jr. et al. discloses an automatic light-extinguishing circuit for extinguishing, for example, the head lights of an automobile some interval of time after the ignition switch is opened. Again, the thorny problem of having to access the electrical terminals on the light switch and the ignition switch during the original installation or retrofitting installation is not addressed in this patent.

It is therefore the goal of the present invention to provide an improved attachment for automatic light switching for an automobile so versatile that it would be adaptable to virtually all kinds of automobiles made around the world and would provide the users of those automobiles with all the benefits without virtually any inconveniences in costs or operations.

SUMMARY OF THE INVENTION

The principle of the present invention would be easier to understand in details later on if it is considered as follows:

In a vehicle having a battery therein with one polarity connected to said vehicle metal chassis defined as ground or ground potential and the other polarity defined as high potential, a light switch therein comprising an OFF position that by itself would interrupt the closed paths that energize the park and head lights, a PARK position that by itself would close the path that energizes a set of park lights, and a HEAD position that would close the paths that energize a set of head lights as well as said set of park lights; and an ignition switch therein including at least a RUN mode that would connect said battery power to said vehicle ignition system as well as to said accessory bus energizing eventually a set of designated accessories, a STOP mode that would disconnect from said battery power the ignition system and said accessory bus, and an ACC mode that would connect said battery power strictly to said accessory bus only, an attachment for automatic light switching comprising:

a. a control block including sensing input means to gather information on the logical states of devices outside of said control block, controlled output means to actuate devices outside of said control block, and logical processing means including memory means to decide on the power level of said controlled output means according to the present and the past logical states of said sensing input means;

b. a controlled switch means actuatable by said controlled output means of said control block for changing the electrical resistance through said controlled switch means from a practically infinite value to a practically zero value, and vice versa;

c. electrical wire insert means and electrical interrupting means connected to a plurality of readily accessible terminals of the electrical system of said vehicle as well as to the terminals of said controlled switch means to allow said controlled switch means to be inserted anywhere in the electrical paths that serve to energize said sets of lights of said vehicle; and d. electrical wire signalling means connected to easily accessible transducer means of the states of said light switch and to an easily accessible transducer means of the states of said ignition switch, as well as to said sensing input means of said control block to provide information to said logical processing means about the logical state of said sets of lights as well as about the logical state of the ignition switch.

Implemented in such a manner, all the conventional operations of said light switch in conjunction with turning-on or energizing said sets of lights would take place as usual as soon as said light switch is moved from the OFF position to the PARK or to the HEAD position. This can be done easily if said control block is seen as realized with integrated circuits forming a logical circuitry means of any sophistication, or, better yet, as realized with a modern, low-power microcomputer including built-in non-volatile programming coupled with some read-and-write memory and by implementing suitably the actuation of said controlled switch means by said control block according to the combinations and sequences of different states of the sensing inputs of said control block.

In an improved vehicle, after there has been a combination of said light switch in the HEAD position and said ignition switch in the RUN mode, causing the head and park lights of said vehicle to be energize as usual, and then only the ignition switch is subsequently turned to STOP, the sensing of the change of state at the inputs of said control block would direct said logical processing means of said control block to time itself automatically through a relatively short moment, e.g., a minute, before actuating said controlled switch means to change the electrical resistance therethrough from a practically zero value to a practically infinite value, therefore to reduce the electrical current through the head and park lights of said vehicle to a first preset low level, drawing only energy from said vehicle battery continuously in an insignificant and harmless manner which would not be detrimental to the normal operation of said vehicle thereafter; thus would provide the user of said vehicle with said relatively short moment of lighting to facilitate said user's walk from the parking spot of said vehicle to the final destination; and thus would turn off automatically for said user all the lights of said vehicle, after said relatively short moment, when said user fails, —by forgetting, ignoring or being unable—, to turn said light switch to OFF before getting away for a long absence from said vehicle with the ignition switch in the STOP mode. This first preset low level of energy has been calculated to take a whole year before consuming only about one third of the energy of the smallest automobile battery in use nowadays, meaning that if said vehicle's battery is not losing its energy by any natural, systematic way, said user still can start his vehicle again normally, usually within a few hours to a few weeks from the last use of said vehicle.

Further still, in an environment where it is usually half-dark during the day, many drivers would prefer turning on their park lights for the main purpose of signalling the presence of their car on the road and not to light the road and bother the incoming drivers. After there has been a combination of said light switch in the PARK position and said ignition switch in the RUN mode, causing the park lights of said vehicle to be energized as usual, and then only the ignition switch is subsequently turned to the STOP mode, the sensing of the change of state at the inputs of said control block would direct said logical processing means of said control block to time itself automatically through said relatively short moment before actuating said controlled switch means to reduce the electrical current through the park lights of said vehicle to a second preset low level, thus would turn off automatically for said user all the park lights of said vehicle, after said relatively short moment, when said user fails to turn said light switch to OFF before walking away for a long absence from said vehicle with the ignition switch in the STOP mode. This second preset low-level energy consumption is lower than said first yet, thus, is perfectly negligible.

In both above-mentioned cases, when the user of said improved vehicle comes to the driving of said vehicle again after a few minutes or a few months, he would find not only that all the lights of the vehicle are off, and that he could start his vehicle as usual, but also, in a perfectly harmless manner, that when the ignition switch is in the RUN mode, some or all of the external lights are turned on, depending on which position the light switch was left in. He can leave those lights on, or turn them off then, by returning the light switch to the OFF position.

In another operation, when an improved vehicle is parked and the ignition switch is in the STOP mode, and the user wants to illuminate the area in front of the vehicle for some purpose, he would instinctively reach for the light switch of his vehicle and turn it to the HEAD position, and all the head and park lights would turn on as usual. The user of such vehicle may like to turn on only the park lights of his vehicle when it is immobilized or parked on a dark portion of the road to signal the presence of his vehicle and get away from it for a while. These operations of head or park lights energizing may even be actuated inadvertently by absentmindedness by many of the improved vehicle users. Regardless of what happens, after a set of said lights have been energized by turning said light switch from the OFF to the PARK or HEAD positions while the ignition switch is in the STOP mode, the sensing of the change of state of the inputs of said control block would direct said logical processing means of said control block to time itself automatically through a fixed extended period, e.g., ten minutes, while all the original modes of operations of said light switch in conjunction with de-energizing and re-energizing a set of said lights would be left totally at the discretion of the user of said vehicle, that is to say, the user can turn off those lights anytime he likes by simply returning said light switch to the OFF position, or he can change the energizing of the head and park lights to the energizing of only the park lights, and vice-versa. When the end of said fixed extended period is reached and said ignition switch is still in the STOP mode, said controlled output means of said control block would actuate said controlled switch means to reduce the electrical current through said set of lights to said first or second preset low level, drawing only energy from said vehicle battery continuously in an insignificant and harmless manner which would not be detrimental to the normal operation of said vehicle thereafter, thus providing the user of said vehicle with said useful fixed extended period of energizing said set of lights to perform a certain task about said vehicle when said set of lights would be desirable, or thus would turn off automatically for said user all the lights of said vehicle after said fixed extended period, when said user forgets, ignores or is unable to turn said light switch to OFF after having intentionally or inadvertently turned said light switch to the PARK or HEAD positions when said ignition switch has been already in the STOP mode. In any of these situations, anytime before or after the end of said fixed extended period is reached and said ignition switch is still in the STOP mode, if said user intends to have a set of said lights energized for another fixed extended period, he would only have to turn said light switch to the OFF position first, then to either PARK or HEAD positions again. Or, anytime before or after the end of said fixed extended period is reached, and said transducer means of the state of said ignition switch is made to convey to said control block the logic level meaning that said ignition switch is the RUN mode, then said set of lights would stay energized while all the original modes of operations of said light switch in conjunction with de-energizing any of said set of lights would be left totally at the discretion and responsibility of the user of said vehicle, thus, providing said user with an intentionally controlled means to energize a set of said lights during any length of time beyond said fixed extended period for any special purpose, for instance servicing or testing said vehicle light system, even without having to actually run the engine of said vehicle if said transducer means of the state of said ignition switch uses the accessory bus and said ignition switch is turned to the ACC mode.

The principle of the invention may be viewed as following the simple, logical and friendly strategy of allowing the user of an improved vehicle to:

energize or de-energize a set of head and park lights of said vehicle with said light switch, which can include a dimmer switch and a so called flash-to-pass switch, totally at his discretion when said ignition switch is in the RUN mode, exactly as the ways those switches were supposed to work for the user before the invention was implemented on said improved vehicle;

energize or de-energize the high beams of the head lights with only the flash-to-pass switch, at his discretion, when said ignition switch is in the STOP mode and said light switch is in the OFF position, exactly as the ways that switch was supposed to work for the user before the invention was implemented on said improved vehicle;

automatically de-energize any head or park lights which were energized by said light switch, including said dimmer switch, before said ignition switch was turned from the RUN mode to the STOP mode, after a relatively short moment, e.g., a minute;

automatically de-energize any head or park lights which were energized by said light switch including said dimmer switch while said ignition switch is in the STOP mode, after a fixed extended period, e.g., ten minutes;

de-energize any energized lights by returning manually anytime said light switch to the OFF position;

override any automatic de-energizing anytime by turning said ignition switch to the RUN mode (or to the ACC mode when the embodiment of the invention uses the accessory bus of said vehicle as transducer means for said ignition switch);

go from one operation to another—for instance, from a combination of head and park lights energized and ignition switch in RUN mode, to another combination of only park lights energized and ignition switch in STOP mode—within a very brief instant, e.g., just a little over a second;

extend easily at very low extra cost, the automatic switching to easily forgotten lights, the dome lights, which are usually not a part of the inputs to the reminding chime circuit, if such circuit exists.

Based on the basic principles of operation of the invention, one object of the present invention is to provide an attachment that can retrofit the majority of automobiles in use today for automatic light switching that preserves for the user total intentional control of head and park lights of said automobiles with conventional and widely accepted ways of manipulating a light switch including dimmer and flash-to-pass switches, and that automatically de-energizes for the user any inadvertently energizing of any of the car lights, including specially the head and park lights, and optionally the dome lights.

Another object is to provide such attachment at low costs to the user, especially in terms of quick and easy installation that requires none of the pre-installed wires of said automobiles to be cut and spliced, and none of the electrical terminal of the light switch and ignition switch to be reached for wire connections.

Still another object of the invention is to provide original manufacturers of automobiles to include, at low costs and with ease, an automatic light switching circuit into their products that would enhance their marketability.

Finally, another object of the invention is to provide the user of a vehicle equipped with the invention an automatic means of lighting the way for a safer walk from the parking spot of his vehicle to his final destination.

Other objects and advantages of the invention will become apparent from the following detailed description when taken in conjunction with the accompanying drawings.

BRIEF DESCRIPTION OF THE DRAWINGS

FIG. 16 represents a preferred wiring diagram to be designed into new cars or cars being manufacture that contains originally the diagram of FIG. 1.

DETAIL DESCRIPTION OF THE PREFERRED EMBODIMENT

For the clarity of the description of the invention, it is supposed that in a car on which the invention is to be attached, a battery of the car would have one of its polarity, in general designated as the negative polarity, connected systematically to the metal chassis of the car that serves conveniently as one massive, shareable, low-resistance conductor for all electrical devices of said car, and the potential of this polarity is called ground or ground potential. The other polarity of said battery would be called high potential or hot potential. It is supposed further that in such a car there exists an enabling switch also called an ignition switch which is usually allowed to be turned to its different modes by an ignition key which can be inserted into, and removed from, its receptacle only when this ignition switch is in its STOP mode. In conventionally made cars, this STOP and two other modes, RUN and ACC, are usually provided for the enabling switch or ignition switch. The ACC mode connects the enabling electrical connection of a common line, called an accessory bus, that powers a set of accessories, to the battery high potential. The RUN mode connects the enabling electrical connection of the enabling system (also called the ignition system), as well as the enabling electrical connection of said accessory bus, to the battery high potential. Finally the STOP mode disconnects the enabling electrical connection of the enabling system, as well as the enabling electrical connection of said accessory bus, from the battery high potential. The logical value can be defined in any way in general practice, but would be hereinafter consistently called high when it is nearest to high potential, and low, when it is nearest to ground. Also, in such a car, a terminal of an electrical device, such as a fuse, is said to be electrically nearer to said battery when it is not connected to said battery through an electrical consuming device such as a light filament, but only through an electrical conducting wire or a fusing link.

To facilitate the understanding of the structure and operation of the preferred embodiment of the invention, several sets of description/operation sections would be adopted.

Description/Operation of Environments in Which the Invention is to Work

Figure 1:
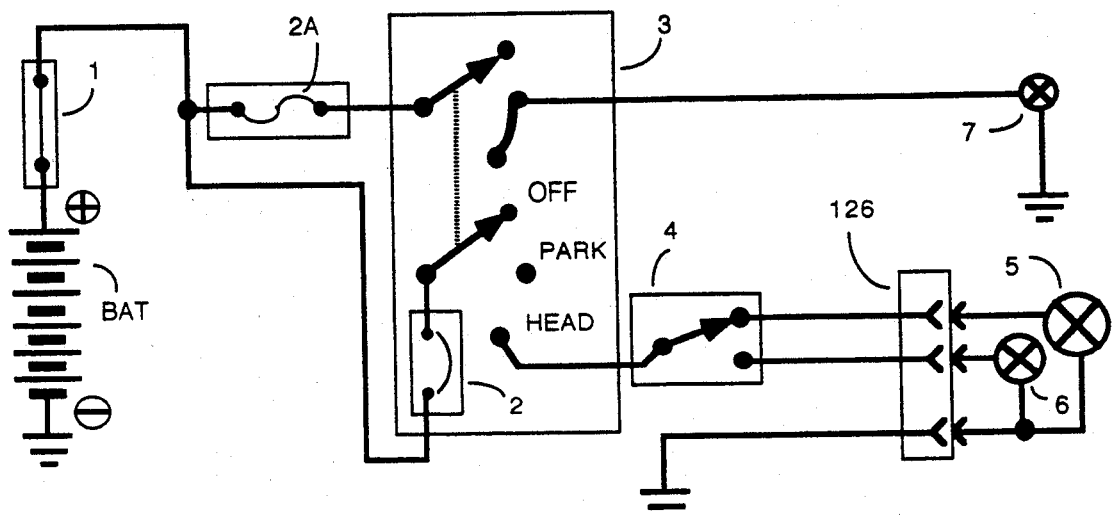
FIG. 1 is the schematic diagram of a typical lighting system wiring found on many basic cars.

FIG. 1 is the schematic diagram of a typical lighting system wiring, reproduced to retain only essential components, from the compilation of diagrams of a great many basic car electrical wirings made available to the public for maintenance purpose by the industries. The feature to be noticed is that the general circuit of the lighting system is protected by a fusing link, also called a fuse link, depicted by numeral 1, near the point where it is connected to the high potential terminal of the vehicle battery. From there, the branch that powers the head lights is further protected by a self-resetting circuit breaker 2 housed generally in the main light switch body; and the branch that powers the park lights is protected by a fuse 2A. The head lights in this case are energized by a combination of a position of the main light switch 3 designated as the HEAD position in series with a single-pole, double-throw latching switch 4, called commonly a dimmer switch because of the fact that it allows the head-light energizing to be switched alternately from a high-power, far-distance beam set 5 of the head lights to a dimmer, less powerful, nearer-distance beam set 6 of the head lights, and vice-versa. Throughout this description, the term light switch is to mean the combination of the just-described main light switch and dimmer switch as well as an optional switch used in the head light circuit called a flash-to-pass switch to be described later on. It will be clear at the end of this description that the combination of different possible positions of the main light switch, the dimmer switch and the flash-to-pass switch contribute eventually to only four situations that logically matter in this invention: all head and park lights OFF, only park lights energized, only head lights energized and both sets of park and head lights energized. These four situations do not need to make the difference whether the high-beam or the low-beam set of the head lights is energized. The head lights are meant to includes either the set of low-beam filaments or the set of high-beam filaments of both head lights sets located on the fight and on the left of the front pan of the car, each head light set on each side comprising a low-beam filament and a high-beam filament in the same light enclosure or comprising such arrangement plus one additional high-beam filament in a second enclosure. Also, to simplify the reading of this description, the park lights 7 would mean to include all the low-power parking lights positioned generally around the car in order to signal the presence and the location of the car, as well as the licence plate lights and the instrument panel lights, which get altogether energized when the main light switch 3 of the car is turned to a position designated as the PARK position as well as said HEAD position of the light switch. The third position of the main light switch is designated as the OFF position, in which the main light switch, by itself, would do nothing to the energizing of all head and park lights of the car if they are in the de-energized state or would de-energize those lights if they were in an energized state.

Figure 2:
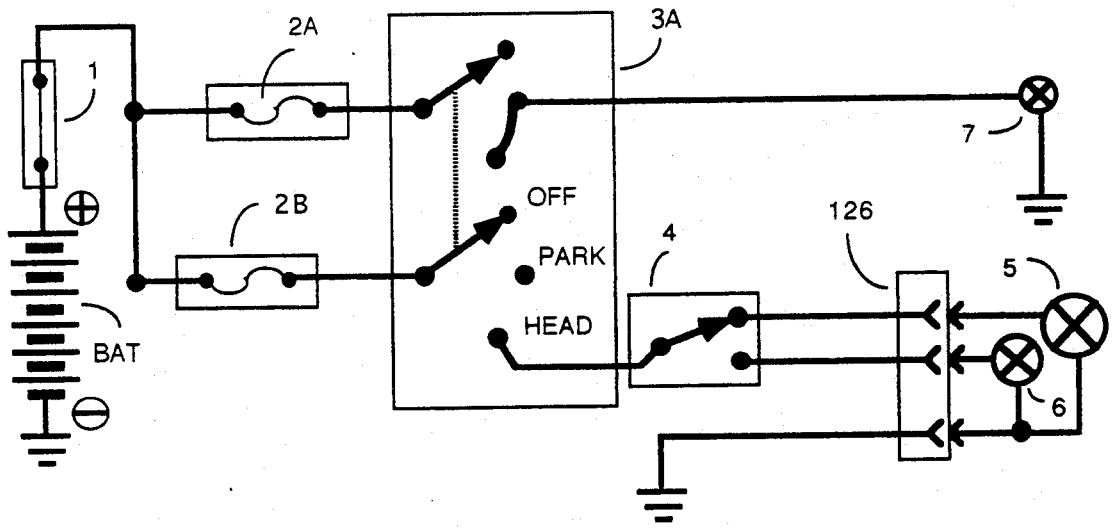
FIG. 2 and FIG. 3 are the schematic diagrams of two other typical lighting system wirings found on many other basic cars.

FIG. 2 is the schematic diagram of another typical variety of lighting system wiring found on many other basic cars. This diagram is only different from that of FIG. 1 in that the circuit breaker 2 in FIG. 1 is replaced by a fuse 2B in FIG. 2, and that such fuse is located in a fuse compartment along with most other fuses of the car. The main light switch in this case does not contain the circuit breaker, and is depicted as 3A.

Figure 3:
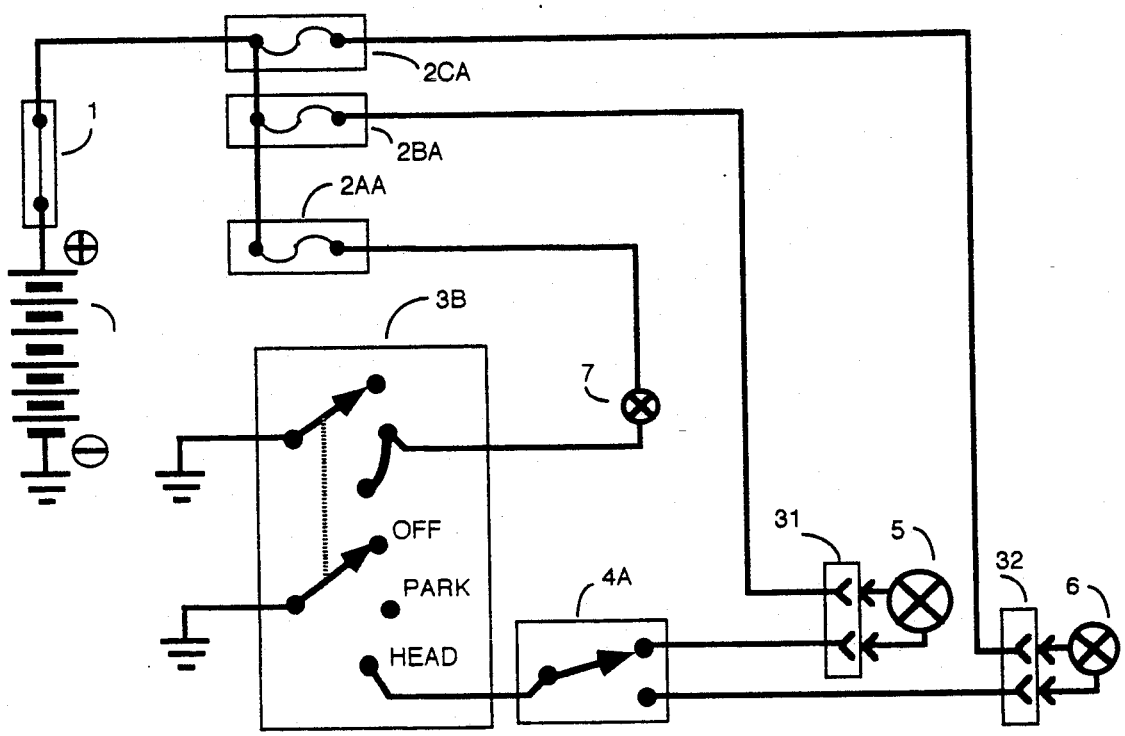

Another sizable variation of FIG. 2 can be found in FIG.3 in which the differences compared to FIG.2 are that the common connection of the two filaments in each head light is connected to the high potential through a common fuse for both sets of filaments or through one of two separate fuses, each for each filament set, while the switching of the head lights is done with the ground line connected to the free end of either filament set of the head lights. The main light switch is designated as 3B, and the dimmer switch is designated as 4A in this case.

Figure 4:
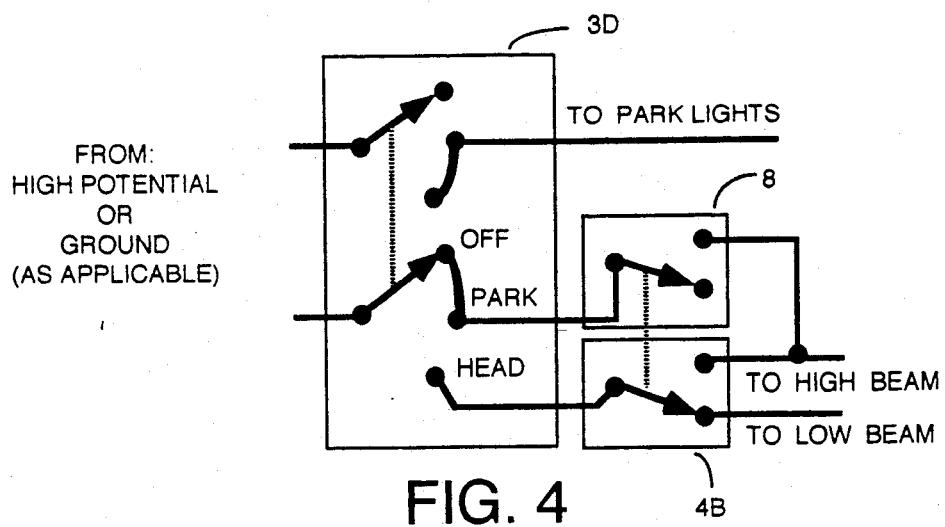
FIG. 4 is a partial schematic diagram of the flash-to-pass option on typical lighting system wiring found on some more advanced cars.

FIG. 4 typifies a partial lighting system wiring found on a many basic cars equipped further with an advanced option in the form of a single-pole, double-throw switch 8, commercially advertised as a flash-to-pass switch, connected in combination with the main light switch 3D and the dimmer switch 4B of the cars. This partial diagram can be an option to the lighting systems depicted in FIG. 1, FIG. 2 and FIG. 3 by simply substituting main light switch 3,3A or 3B on one hand, and dimmer switch 4 or 4A, on the other hand, by main light switch 3D and dimmer switch 4B, respectively. The difference in the main light switch 3D compared to the other switches 3, 3A, and 3B is that there is a connection between the terminals OFF and PARK on the assembly that energizes the head lights. It is easy to see from the diagram that this flash-to-pass switch can be adapted readily to all diagrams of FIGS. 1 to 3, and that it allows a car user to energize, with one hand movement, the high beams of the head lights of his car while the main light switch is in the OFF or PARK positions, as long as said hand movement is maintained at a stop at the end of the course of said hand movement. When said hand movement is relaxed in the reverse direction, this flash-to-pass switch would de-energize those high beams of the head lights. This flash-to-pass switch is, in general, mechanically linked with the dimmer switch, and actuated with a hand movement exactly like the movement for switching the dimmer switch which would enter into its latching action only when the main light switch is in the HEAD position as seen in FIG. 4. Thus, during the time when the main light switch is in the OFF or PARK positions, such as the time when a car is driven during the day time, if there is a need to attract the attention of the drivers of the cars immediately ahead for passing, for instance, this flash-to-pass switch would allow the user of a car equipped with it to flick a hand movement to flash on then off right away the high beams of his cars head lights for a brief moment, without having to turn first the main light switch to the HEAD position as on a car not equipped with such switch.

The main operative elements of an attachment for automatic light switching representing the invention are preferably housed in a container of suitable size, shape and material, to be ultimately fastened onto a convenient part of the car body, and such container is not going to be described here.

Description/Operation of Control Block

Element 10 of FIGS. 11, 11a, 15, 15a, 15b, 16, 17 and 18 depicts schematically the preferred embodiment of the control block of the invention. From the summary description, it is obvious to anyone well versed in the art that this control block can be designed with the general classes of electronic discrete and integrated circuits to do the job. However, the state of the an is such that a circuit built around a specialized type of microcomputer called a microcontroller would do the job a lot better in every way. A microcontroller is commonly defined as a specialized computer on a chip that includes enough read-only memory and read-write memory to hold all the algorithm that directs the microcontroller to do the job. The invaluable advantages of a microcontroller over a general-purpose computer on a chip are that they are a lot less expensive for simple jobs in control, and also that they are in general smaller in physical size, and their pins are used in maximum number to be programmable on demand as inputs or outputs. A modem microcontroller can be reprogrammable repeatedly for optimal algorithm design, and then for fast time-to-market production, it can be massively one-time-programmable inexpensively in the field or at the factory before delivery. State-of-the-art microcontrollers, made with the well known CMOS process, can withstand in permanence the harsh, wide-temperature, wide-potential variations under the hood of an automobile and can be programmed to go into a mode of operation, when idling, in which it would consume current in the order of tens to hundreds of microamperes only. It is easy to calculate later, from each entire schematic diagram embodying the invention designed to be powered in permanence by the battery of the automobile on which the invention is attached, that it would take this kind of current drawing by itself more than a hundred years before it would have drained the smallest fully-charged battery in use on cars today, enough to render it unusable for another engine starting. It is obvious that if an automobile is left not running continuously, long before then, many physical phenomena would render the battery unusable already. Attached in that manner on a vehicle, it is absolutely certain that the invention would not be detrimental to the normal operation of said vehicle which, in normal practice, would be left not running only for at most a year.

In FIGS. 11, 11a, 15, 15a, 15b, 16, 17 and 18, a microcontroller 10 is chosen as a preferred component of the control block of the invention. Pins 11 with capacitor C4 attached for despiking, is to be attached to high potential to power the microcontroller in permanence. The current flowing into this pin varies from tens of milliamperes when the microcontroller is active, to tens or hundreds of microamperes when it idles. Pin 15 is to be connected to ground potential of the vehicle receiving the invention. Each of the pins 12, 13, 14 and 17 is to be programmed and used as sensing input means, and connected to ground when not in active use as an input. Resistors R1, R2, R3, R4 and capacitors C1, C2, C3, C5 are attached as in the figure for the purpose of making said sensing inputs more electrical-noise and electrostatic-discharge resistant. Pin 16 is to be programmed as a controlled output means. The built-in logical processing means of this microcontroller would receive preprogrammed instructions from the flow of a pre-designed algorithm kept on the built-in programmable read-only memory, would use the built-in read-write memory as temporary, modifiable registers, as well as would use the logical states of pins 12, 13, 14 and 17 to deduce the past and present states or the combinations and sequences of states of said sensing input means to decide when to energize and when to de-energize said controlled output means.

Description/Operation of the Control Block Algorithm

Figure 5A:
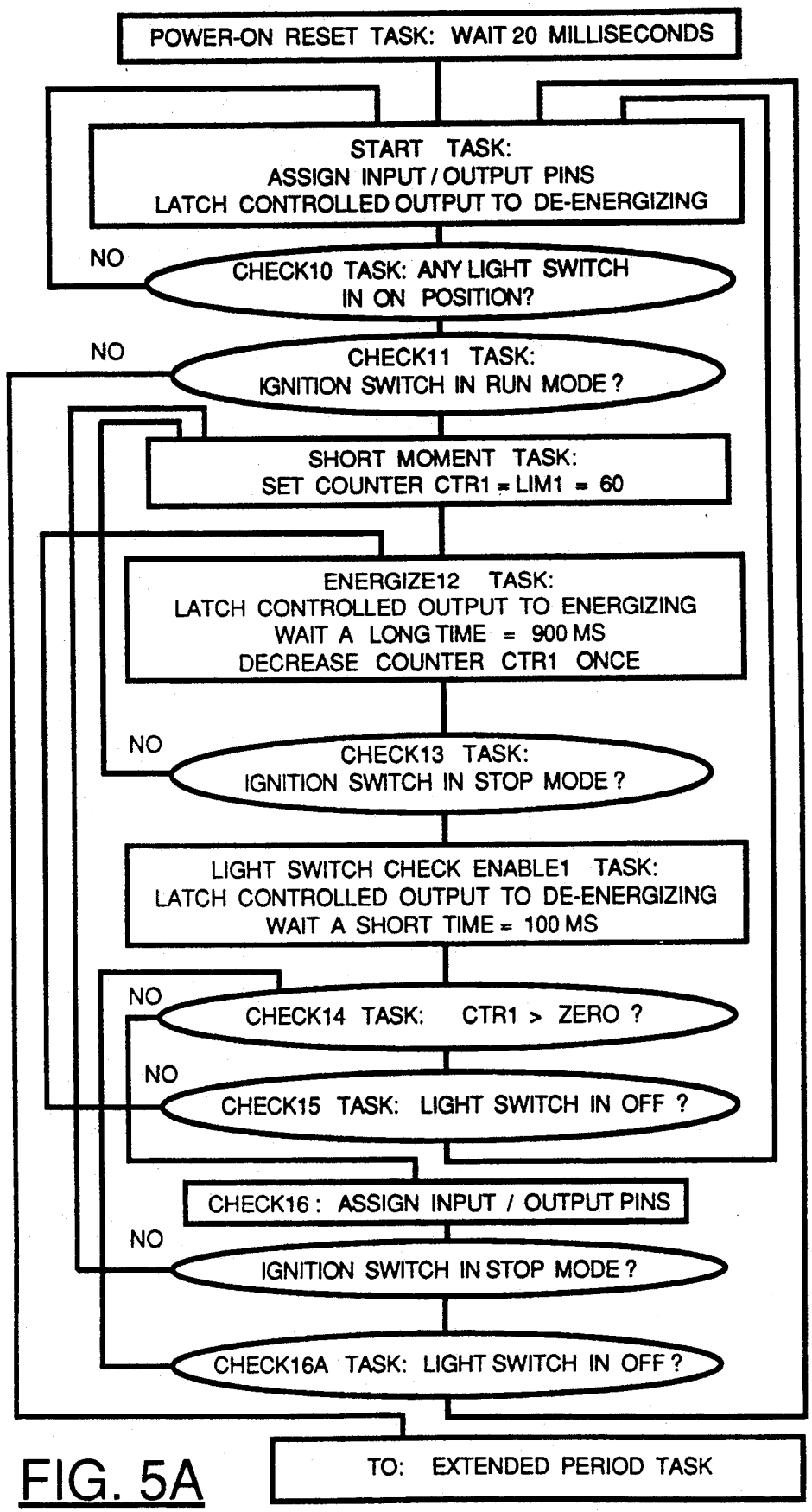
FIG. 5A and FIG. 5B are the first and second parts of the preferred algorithm governing the preferred control block of the invention.
Figure 5B:
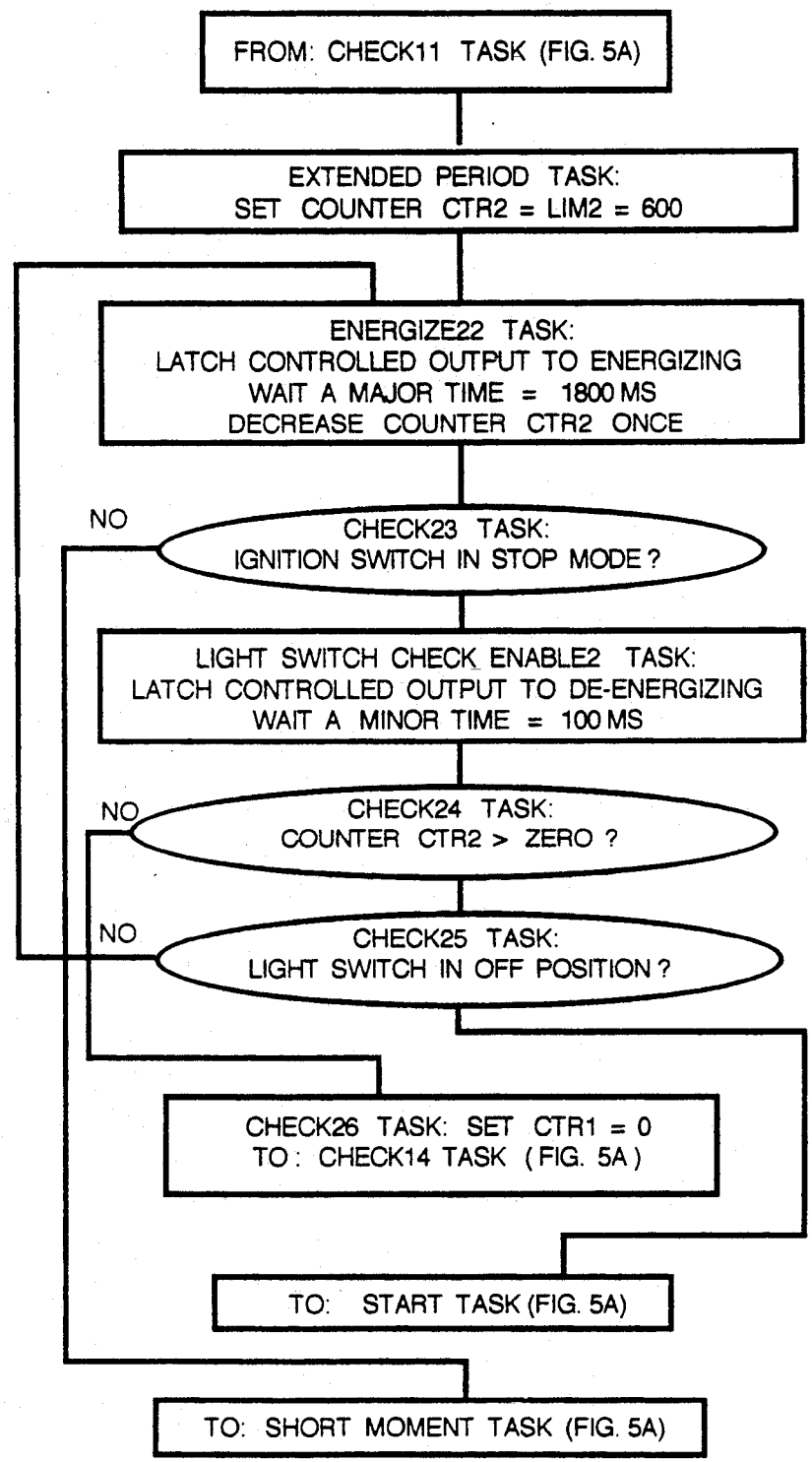
Figure 5C:
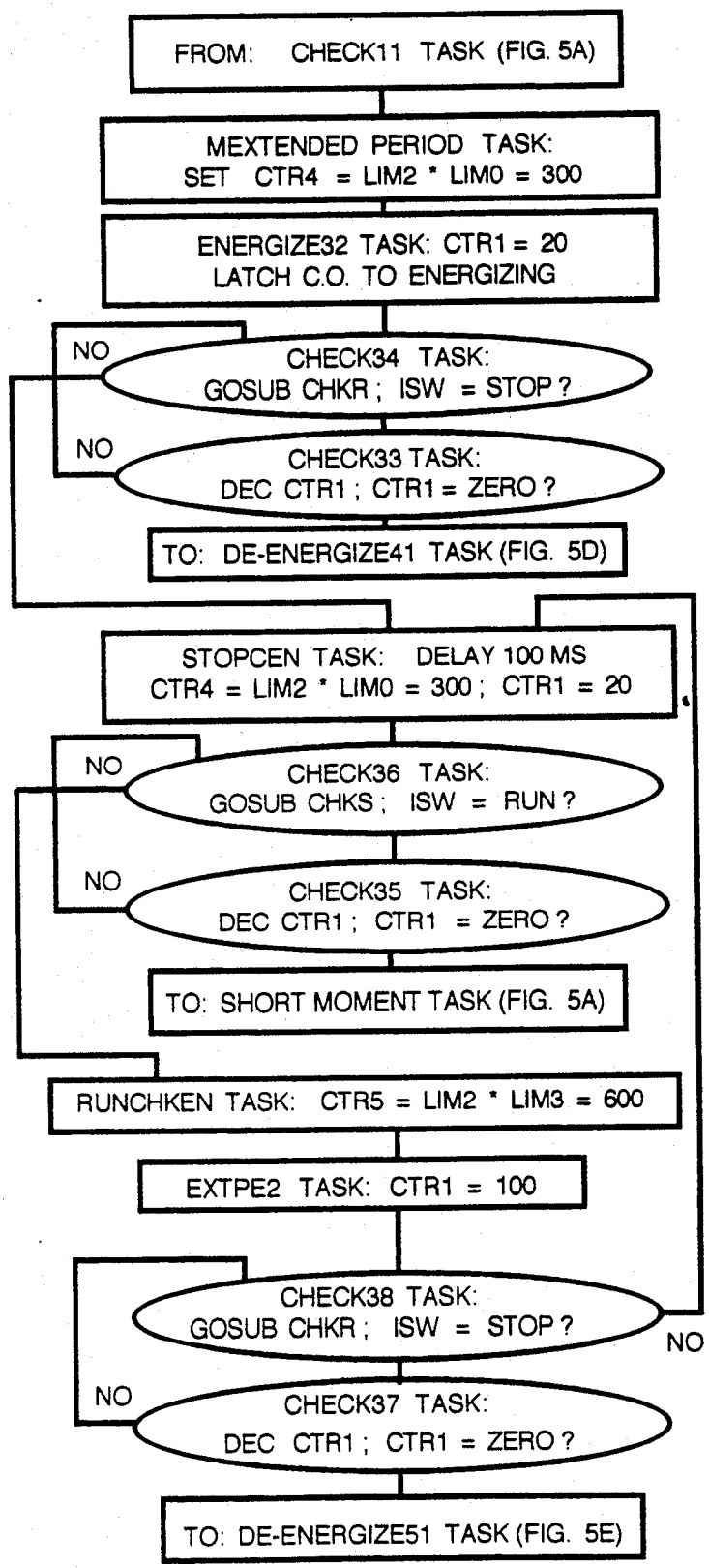
FIGS. 5C to 5G depict the improved operations in conjunction with FIG. 5A.
Figure 5D:
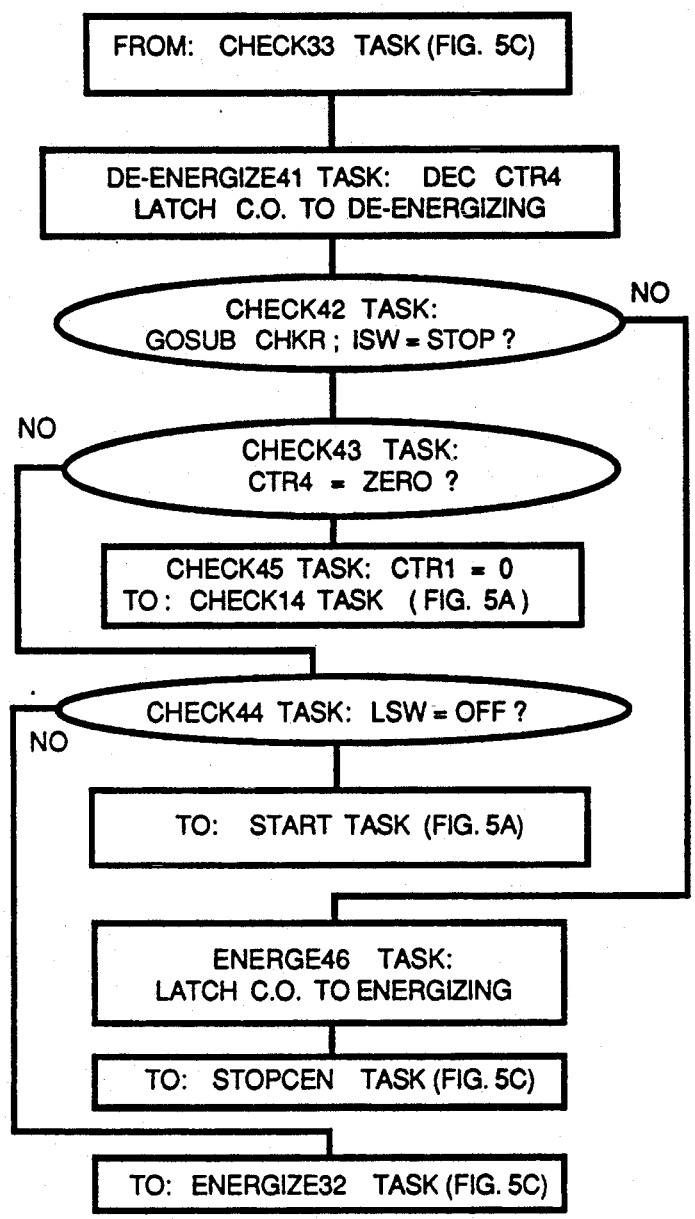
Figure 5E:
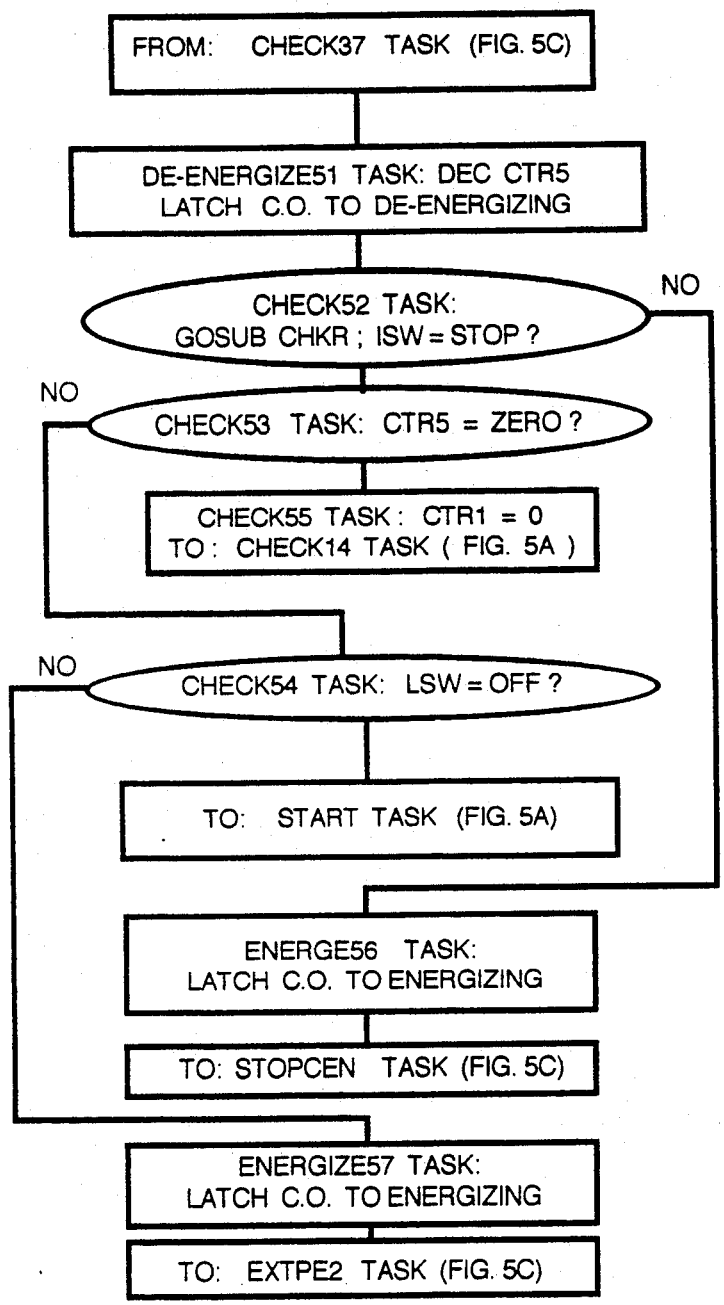
Figure 5F:
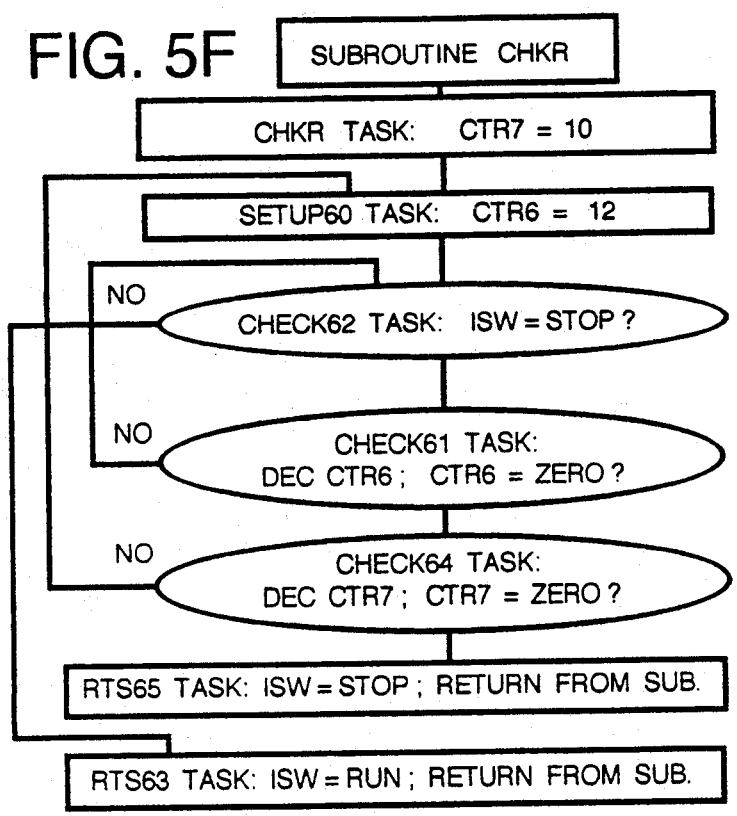
Figure 5G:
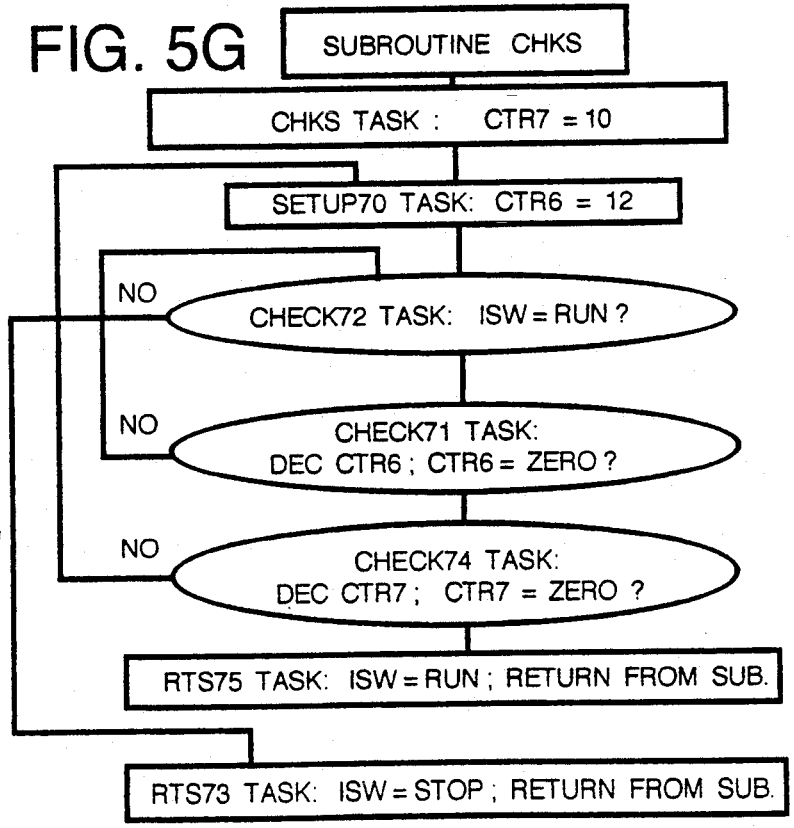

FIG. 5A and FIG. 5B show, in flow chart fashion, the first and second parts of the preferred algorithm governing the preferred control block of the invention, using a low-power microcontroller which is widely available at the present time on the market at low cost, is extremely flexible and easy to use, is reprogrammable for utmost algorithm optimizing, is one-time programmable for short time-to-market production, and can operate easily with from very low to very high speeds.

The reprogramming, built into the on-chip read-only memory, is an example for directing said control block through the preferred logic tasks in steps that take a minimum of about 125 microseconds at each decision making step. For ease of reading the flow Chart representing this preprogramming, at every decision task represented by a task enclosed in an ellipse, where there are two directions to take depending upon the result for the decision, the vertical direction always represents the positive answer to the result for the decision, and the lateral direction is always the negative answer to the result for the decision. The flow of the chart always follows the down direction if the flow line connecting any two tasks is vertical, and can follow the up or down direction when the flow line connecting two tasks begins laterally at one ellipse. Note also that for many counting tasks, when the count may exceed 255, which is the maximum count possible with a first eight-bit counter, a second counter of eight-bit length has to be used as a multiplier of the first counter, and so on, since the microcontroller used in the prototype example works with only eight-bit data words.

As seen in FIG. 5A, the algorithm is outlined as follows:

POWER ON RESET TASK: Wait about 20 milliseconds for microcontroller clock to stabilize correctly.

START TASK: assign input and output pins on microcontroller; latch controlled output (C.O.) to de-energizing.

CHECK10 TASK: check, (by means of logic states of the electrical wire signalling described below), if any controlled light switch is in on position. If not, go to beginning of START TASK to continue checking; if so then CHECK11 TASK: check if said ignition switch is in the RUN mode, (by means of logic states of electrical wire signalling described below). If not, go to EXTENDED PERIOD TASK; if so then SHORT MOMENT TASK: set a counter CTR1 to a limit count LIM1 (to be, as an example, equal to 60), for said relatively short moment, then ENERGIZE12 TASK: latch said controlled output means to energizing; wait a long fraction of a second (900 ms, for example); count down or decrease said counter CTR1 once.

CHECK13 TASK: check if said ignition switch is in the STOP mode, (by means of logic states of electrical wire signalling described below). If not, go to beginning of SHORT MOMENT TASK to energize lights continuously; if so, then LIGHT SWITCH CHECK ENABLE1 TASK: latch said controlled output means to de-energizing; wait for a short fraction of a second (100 ms, for example); the sum of said long fraction of a second and said short fraction of a second multiplied by said limit count1 being equal practically to said relatively short moment, (60 seconds in this example).

CHECK14 TASK: check if said counter is still greater than zero yet. If not, go to CHECK16 TASK; if so, then CHECK15 TASK: check if said light switch is in the OFF position, (by means of logic states of electrical wire signalling described below). If not, go to beginning of ENERGIZE12 TASK; if so, then go to beginning of START TASK.

CHECK16 TASK: as a good practice, assign again input and output pins as before, in order to guard the different registers of the microcontroller against the corruption of the harsh electrical environment and de-energize the controlled output to be sure. Check if the ignition switch is in the STOP mode, (by means of logic states of electrical wire signalling described below). If not, go to SHORT MOMENT TASK; if so, then CHECK16A TASK: check if the light switch is in OFF position. If so then go to START TASK; if not then loop to CHECK14 TASK in order to continue checking the position of the light switch rapidly, (at intervals of about 5 ms, repeatedly, in this numerical example).

Referring to FIG. 5B, the algorithm continues with:

EXTENDED PERIOD TASK: set counter CTR4 to a limit count LIM2 * LIM0 (to be, as an example, equal to 300 repeats of 2-second cycles of blinking, for 10 minutes) for said fixed extended period, then ENERGIZE22 TASK: latch said controlled output means to energizing; wait a major fraction of a second (1800 ms and some overhead time amounting to about 100 ms, for example); count down counter CTR2 once, then CHECK23 TASK: check if said ignition switch is in the STOP mode, (by means of logic states of electrical wire signalling described below). If not, go to beginning of EXTENDED PERIOD TASK; if so, then LIGHT SWITCH CHECK ENABLE2 TASK: latch said controlled output means to de-energizing; wait for a minor fraction of a second (100 ms, for example); the sum of said major fraction of a second and said minor fraction of a second multiplied by said limit count2 being equal practically to said fixed extended period, (10 minutes in this example);

CHECK24 TASK: check if said counter is still greater than zero yet. If not, go to CHECK26 TASK; if so, then CHECK25 TASK: check if said light switch is in the OFF position, (by means of logic states of electrical wire signalling described below). If not, go to beginning of ENERGIZE22 TASK; if so, then go to beginning of START TASK.

CHECK26 TASK: simulate the case of a short moment duration reaching already its end and the light switch is still ON, by setting CTR1=0, then go to CHECK14 to continue checking at high speed—at about 5 ms intervals—when the light switch is in the OFF position in order to go to the initial START task to wait for all possible cases to arrive.

The numerical example in this algorithm would make said short moment last about 60 seconds, and said extended period, about 10 minutes. When the logic of the invention is to de-energize any lights automatically for the user, a blinking of high on-to-off ratio in the lights being energized is executed by the algorithm. As seen in the above flow chart and as explained in details later, this blinking is used conveniently as a novel and powerful way to allow the checking of the state or the position of the light switch (namely, OFF, PARK or HEAD position), by means of logic states of electrical wire signalling means described below, without ever having to establish the difficult access to the electrical terminals on the body of the main light switch as required by many patents of prior art. In this invention, the checking of the state of the light switch, including the dimmer switch and the flash-to-pass switch where applicable, is done easily during any moment when the controlled switch means is already non-conducting or commanded by the control block to be non-conducting and then sensing the logic level at a suitably chosen end of each pair of relay contact terminals, each said pair of contact terminals being connected to the two terminals of a suitably chosen resistor defined as sensing resistor. It is proven empirically that this way of sensing always provides a voltage that changes from ground to high voltage, (or vice versa, depending upon the location of the insertion of the relay contact terminals), when there is or not an electrical current flowing through said sensing resistor; such current, in turn, is caused by the closing or opening of the light switch section in series with the circuit wire connected to that particular relay's contact terminals. This way of sensing the state of the light switch allows the wire interrupting means to be located anywhere in series with the wiring circuit of the lighting system of a vehicle, so that in each environment where the invention is to work, this allows us to locate the wire interrupting means electrically and physically at a convenient place which is not restricted, for instance, to a location between the main light switch and the set of head lights as in many of the teachings of prior art. Using a microcontroller in conjunction with the sensing of the state of the light switch and the ignition switch makes it very easy to accommodate any logic level, (high or low, consistently derived from a certain state), representing a sensed state at one of the inputs of the microcontroller, depending upon the type of the adopted transducer means in the electrical wire signalling means, without having to add any extra hardware for logic inversion. Also, the location where the state of the microcontroller is at any moment in its algorithm reflects the cumulative actions the control block has taken based upon the different states of the light and ignition switches in the past and now determines clearly and unequivocally what action to take, given the present state of the light and ignition switches; thus such microcontroller serves as a convenient sequential and combinational logic circuit for the control block. The rate of about one blink per second for the short moment, about two seconds for the extended period and ninety-percent (or more) on, ten-percent (or less) off duty cycle for both are preferable. The values in this numerical example are deemed good compromises in simplifying the operations of the invention for the users in terms of battery safeguarding, quick manual changes in different schemes of lighting, intrinsic value of desirable lighting and added benefit of built-in diagnostics.

Battery safeguarding: even energizing all the high beams of head lights and all the park lights of a vehicle for up to 30 minutes (let alone up to 10 minutes as proposed here), before automatically de-energizing still preserves always enough energy in the battery for the next starting. The proposed 10 minutes extended period is to insure that the vehicle battery would be safeguarded, even when it is of old age.

Figure 10:
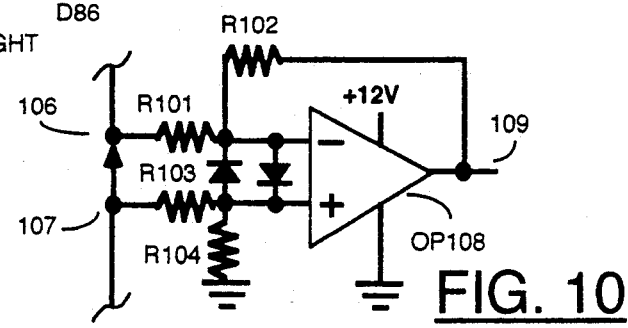
FIG. 10 shows a way of providing a logical signal by virtue of measuring and amplifying the voltage drop across two relay contact terminals.

Quick manual changes in different schemes of lighting: the blinking rate determines, as seen in the algorithm, the rate of checking the earliest moment when the light switch is turned to the OFF position while the invention is still timing itself in the process of automatically de-energizing a set of lights for the user. This situation happens when a user of an improved vehicle turns the ignition switch to the STOP mode while the light switch is in the HEAD or PARK position, then decides to turn on the park lights for an extended period (10 minutes) before going away for a while. It is obvious that, without opening the contact terminals of the relay used as the controlled switch means, it would be difficult to sense the logic level change which is caused by the change of the light switch from the PARK or HEAD position to the OFF position, because the service of the sensing resistor across each pair of relay contact terminals is now lost by the shorting of these contact terminals. As said, it would be difficult, but not impossible, because the sensing of this particular change in the light switch from PARK or HEAD position to the OFF position can be done, as one of the least difficult solutions, by an electronic transducer means with additional hardware in the form of a high-wattage, low-resistance resistor suitably located in series with each pair of relay contact terminals to drop across that resistor a small voltage proportional to the current flowing through it. This low-resistance resistor even can be in the form of the relatively small resistance which is formed naturally across the closed contact terminals of the concerned relay. This small voltage would be zero, practically, when the light switch is in the OFF position, and about 0.1 to 0.3 volt in practice, when the lights are turned on by the light switch through these contact terminals which are closed by the controlled output. It would require further suitable amplification of said small voltage to bring it to usable logic levels, by means of a low-power operational amplifier, configured in differential amplifier if necessary, as can be seen in FIG. 10. Points 106 and. 107 of FIG. 10 represent a pair of contact terminals of a relay. Resistors R101, R102, R103 and R104 may be chosen along with operational amplifier OP108 to be connected as in FIG. 10 to amplify the small voltage drop across terminals 106 and 107 to produce two distinct logic levels at output 109 to be used to sense whether there is a current above a certain value flowing across these terminals. The two diodes connected in parallel and inverted in front of operational amplifier OP108 act along with resistors R101 and R103 to protect in practice the inputs of the operational amplifier from the high-voltage surges between contact terminals 106 and 107. To be usable in this application, operational amplifier OP108 has to consume current in the order of tens of microamperes only in operation. One circuit similar to FIG. 10 would be needed for each pair of contact terminals; or additional resistors with a single OP108 can be used to monitor several pairs of contact terminals according to the well known resistor-transistor-logic (RTL) technology. It can be appreciated that this solution in any form would cause added cost and bulkiness, and would diminish the general reliability of the invention. Since there is absolutely no need for the energized lights which are in the process of waiting to be de-energized automatically, to stay on constantly, this invention prefers the elegant and beneficial use of the blinking solution. It is also easy to verify that adopting the algorithm of FIG. 5A and FIG. 5B, and the two rates of blinking of one second for the short moment operation and two seconds for the extended period operation, it would require a small fraction of a second after the ignition switch is turned to the STOP mode before the user can turn the light switch to the OFF position, wait for a little over a second and then to the PARK position again to be in the automatic extended-period time delay operation, if this operation is wanted instead of the more-likely useful short-moment time delay operation. It can be seen likewise that an interval of a little over two seconds would be required when a user is trying to lengthen an on-going extended period with another extended period by turning the light switch to OFF, waiting for a little over two seconds, and turning the light switch to PARK or HEAD again.

Intrinsic value of desirable lighting when wanted: 90 percent or more of on time versus 10 percent or less of off time yields virtually the same useful lighting energy as 100 percent on time, thanks to the thermal inertia of the light tungsten filaments.

Added benefit of built-in diagnostics as for the correct operations of the invention: the blinking of the lights in the automatic modes, visible despite short off time, serves to indicate that the invention functions correctly in short-moment mode, if the rate is about one second, and in extended-period mode, if the rate is about two seconds.

It can be seen, from the reading of the algorithm, that it would be extremely easy to modify to have the extended period to last 30 minutes instead 10 minutes, (for instance, by simply changing the limit of CTR4 at the ENERGIZING22 TASK in FIG. 5B from 300 to 900), but it is decided that 10 minutes would make users feel more secured when they have a relatively old battery which normally does not hold very much charge as when it was new, and that one minute for short-moment time delay and ten minutes for extended-period time delay would be easier to remember. Also, at the risk of rendering the invention more sophisticatedly useful but at the same time more complicated to the users, it can be seen by anyone well versed in the an of microcontroller programming, that at least one other potentially useful automatic light switching operation may be created. Suppose, to fix the idea, that a user intentionally needs to turn on the park lights for a fixed extra extended period, e.g., 100 minutes, and then to have the invention turn them off for him automatically. This kind of need often occurs in many foreign countries where streets are narrow and not very well lit at night: parked cars need to be drastically visible at night from afar to avoid fender scratching by other passing cars. Simply modifying the above example of algorithm at suitable locations, the invention can determine a procedure of steps that the user should take to achieve what he wants. FIGS. 5C to 5G, adopted as a replacement of FIG. 5B, shows an example of implementation that works. In the place of the EXTENDED PERIOD TASK of FIG. 5B, the procedure would begin now at a modified task called MEXTENDED PERIOD TASK, for instance, entered into from FIG. 5A when there is a case in which the light switch is turned into the PARK position and the ignition is already in the STOP mode. It would then go into the extended-period operation similar to the one explained above in FIG. 5B of the algorithm, blinking the lights every 2 seconds. Any time after that, without using any extra switch whatsoever, it checks at very short intervals of time if the user would move the ignition switch sequentially in steps separated between, for instance, 0.2 and 2 seconds, in a predetermined pattern of steps, e.g., from STOP to RUN then STOP. If this pattern is recognized successfully, it would go ahead with said extra-extended-period time delay operation, blinking every 10 seconds, (with about 10 seconds on and 0.1 second off, for diagnostic benefits), for 100 minutes before stopping automatically; if not it would go on with the extended-period time delay operation, blinking every 2 seconds and continue diligently to check for said predetermined pattern of steps in the ignition switch until the end of the pre-assigned 10 minutes for the extended-period time delay.

During the particular time when the extended-period time delay operation goes on energizing the lights before the automatic turn-off, if the light switch is moved to the OFF position—while the ignition switch is still in the STOP mode—for a little over 2 seconds then to the PARK position again, the invention would go to the beginning of a full cycle of said extended-period operation again while waiting for that particular sequence pattern until its own end of duration. During the particular time when the extra-extended-period time delay operation goes on energizing the lights before the automatic turn-off, if the light switch is moved to the OFF position—while the ignition switch is still in the STOP mode—for a little over 10 seconds then to the PARK position again, the invention would go, not to the extra-extended-period operation but to said extended-period operation again while waiting for that particular sequence pattern until its own end of duration; this logic being adopted to force the user to confirm his real intention about the extra-extended-period operation. Also, during said particular time when one of these two extended- or extra-extended-period operations goes on energizing the lights before the automatic turn-off, if the ignition switch is moveA from the STOP mode to the RUN mode, the operation going on at said particular time would stop and a set of lights would be energized continuously by whatever light switch turned to the on position at that moment, and the algorithm concentrates diligently on monitoring for up to 2 seconds to see if a mode STOP would happen to the ignition switch within that 2-second time. If no STOP mode happens within 2 seconds, it would logically assume that the user either is driving the vehicle as usual or he is in the process of initiating a short-moment time delay operation of the lights as described in the algorithm of FIG. 5A. It is understandable that what has been discussed for the extended-period and extra-extended-period operations as applicable to the PARK position applies also similarly to the HEAD position of the light switch, as the controlled switches, in the form of a multi-pole relay, for different sets of lights are preferably ganged together as in FIGS. 11, 11a, 15, 15a, 15b, 16, 17 and 18, and, when the multi-pole relay is energized, which set of lights is on is determined by which correspondent light switch is turned to the on position. As part of the preferred algorithm, during any of the extended or extra-extended operation, any light being energized until automatic turn-off can be manually turned off any time by moving the light switch to a position wherein it is not supposed to be energized; any other lights commanded to be on by the light switch will continue to be on until the automatic turn-off.

The details of the steps in the last examples of algorithm modifications which demonstrate the great extent of modifiability of the invention are clearly depicted in the flow chart in FIGS. 5C to 5G. It is easy to see that programming steps can be added to recognize the same sequence STOP-RUN-STOP when the algorithm enters said short-moment operation in order to directed it toward said extra extended-period operation. This obviously would make the operations of the invention easier to remember.

Description/Operation of Controlled Switch Means

Figure 6A:
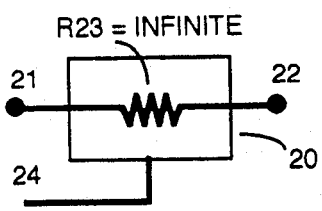
FIG. 6A and FIG. 6B show the two ideal states of a controlled switch.
Figure 6B:
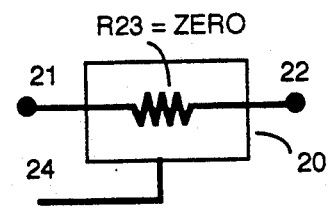

There is illustrated in FIG. 6A and FIG. 6B a controlled switch 20 in accordance with the present invention. FIG. 6A represents an ideal form of controlled switch 20 in one of the two states, in which its pair of contact terminals 21 and 22 are connected with each other by a fictive resistor R23 behaving electrically as an infinite resistance, a small fraction of a second after a first logic value is applied to input 24. Generally, this particular logic value can be any one of the two of the logic values, and depends only on how the controlled switch 20 is configured, as long as it is always consistent in affecting fictive resistor R23. This state of said controlled switch 20 is usually defined as its off or non-conducting state. FIG. 6B represents an ideal form of controlled switch 20 in the other state, in which fictive resistor R23 between its pair of contact terminals 21 and 22 changes electrically into a zero resistance, a fraction of a second after the second logic value is applied to input 24. This state of said controlled switch 20 is defined as its on or conducting state. Such an idealized controlled switch may be materialized in practical cases by the general classes of electromechanical switches characterized by a transistor of suitable technology, a thyristor, a triac, and an electromechanical relay or simply relay. However, for the application in this invention, it can be only represented best by a power MOSFET transistor and by a single-pole, single-throw, normally-open relay of suitable rating, in terms of low on, high off resistance. In terms of cost and ruggedness, a relay is still preferable.

Figure 6C:
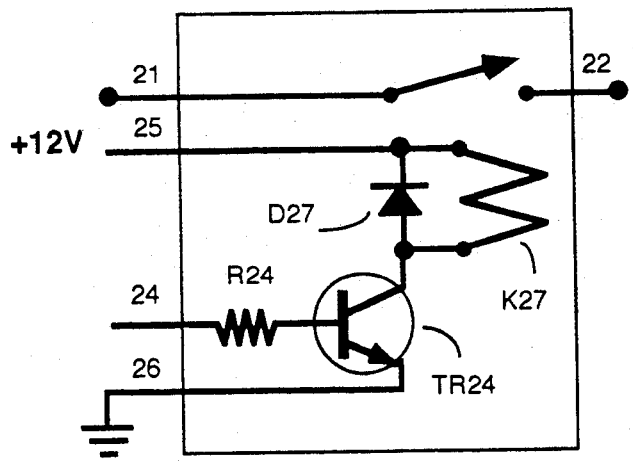
FIG. 6C illustrates a practical controlled switch means using a relay.

There is illustrated in FIG. 6C a controlled switch means using a relay circuit with its two contact terminals 21 and 22, and its input 24. Powering terminals 25 and 26, as well as internal elements D27, K27, R24 and TR24 not present in the ideal representations of FIG. 6A and FIG. 6B are practical elements to make the relay circuit approach the ideal controlled switch better. Powering terminal 25 and 26 are to be connected to high potential represented also as +12 V, and ground, respectively. Resistor R24 is to limit suitably the current into the base of transistor TR24 connected as a simple common-emitter amplifier in the figure, in order to boost the power level of the logic high value (coming from the controlled output means described above) impressed at input 24 when the conducting state of the relay is wanted, enough to actuate coil K27 suitably to close the two contact terminals 21 and 22 by electromagnetic force with a built-in shorting conductor, thus making the pair of contact terminals 21 and 22 conducting. R24 is there also to cut off the current in coil K27 when the controlled output means at input 24 is at low logic level, or when it is tristated, meaning made to behave as if it were connected through an infinite resistance. So, when a tristate or a logic low value is at input 24, transistor TR24 would cut off the current in coil K27, and a built-in spring would act on said shorting conductor to remove it from contact terminals 21 and 22, and make this pair of contact terminals non-conducting. Diode D27 is there as the well known damping element to prevent voltage surges in K27 from killing TR24. Turn-on and turn-off times of such relay in practice are about 10 ms.

Figure 6D:
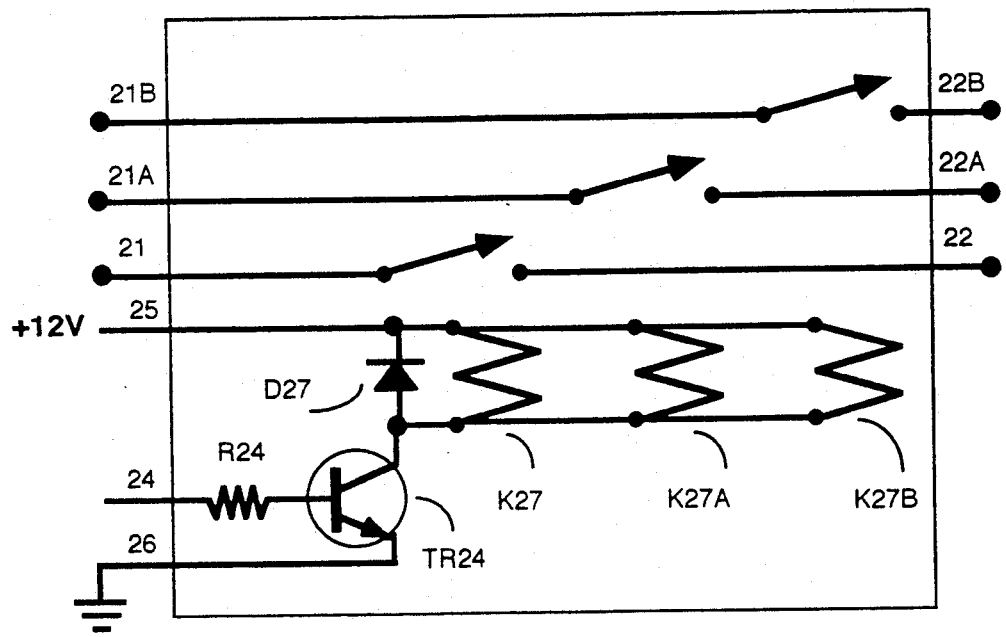
FIG. 6D shows a practical way of making a multiple-pole, single-throw relay.

In accordance with the present invention, depending upon the environment where the attachment is put to use, a controlled switch means of the invention may need more than a single pair of contact terminals 21 and 22 as in controlled switch 20. FIG. 6D shows a practical and versatile way of securing a controlled switch means with three pairs of single-throw, normally-open contact terminals, equivalent to a triple-pole, single-throw, normally-open relay. It suffices to place the coils K27A and K27B of two additional relays in parallel with the coil K27 of the relay of FIG. 6C, and use their pairs of contact terminals 21A and 22A, and 21B and 22B as the additional pairs of contact terminals. In general, this process of getting more contact terminal pairs can be repeated as long as transistor TR24 and resistor R24, reselected if necessary, can accommodate the said power boosting for the increased number of coils. This way of making multi-pole, single-throw relays is practical, as very good power relays already made for automotive uses are inexpensive only in the single-pole, single-throw, normally open type.

Figure 11:
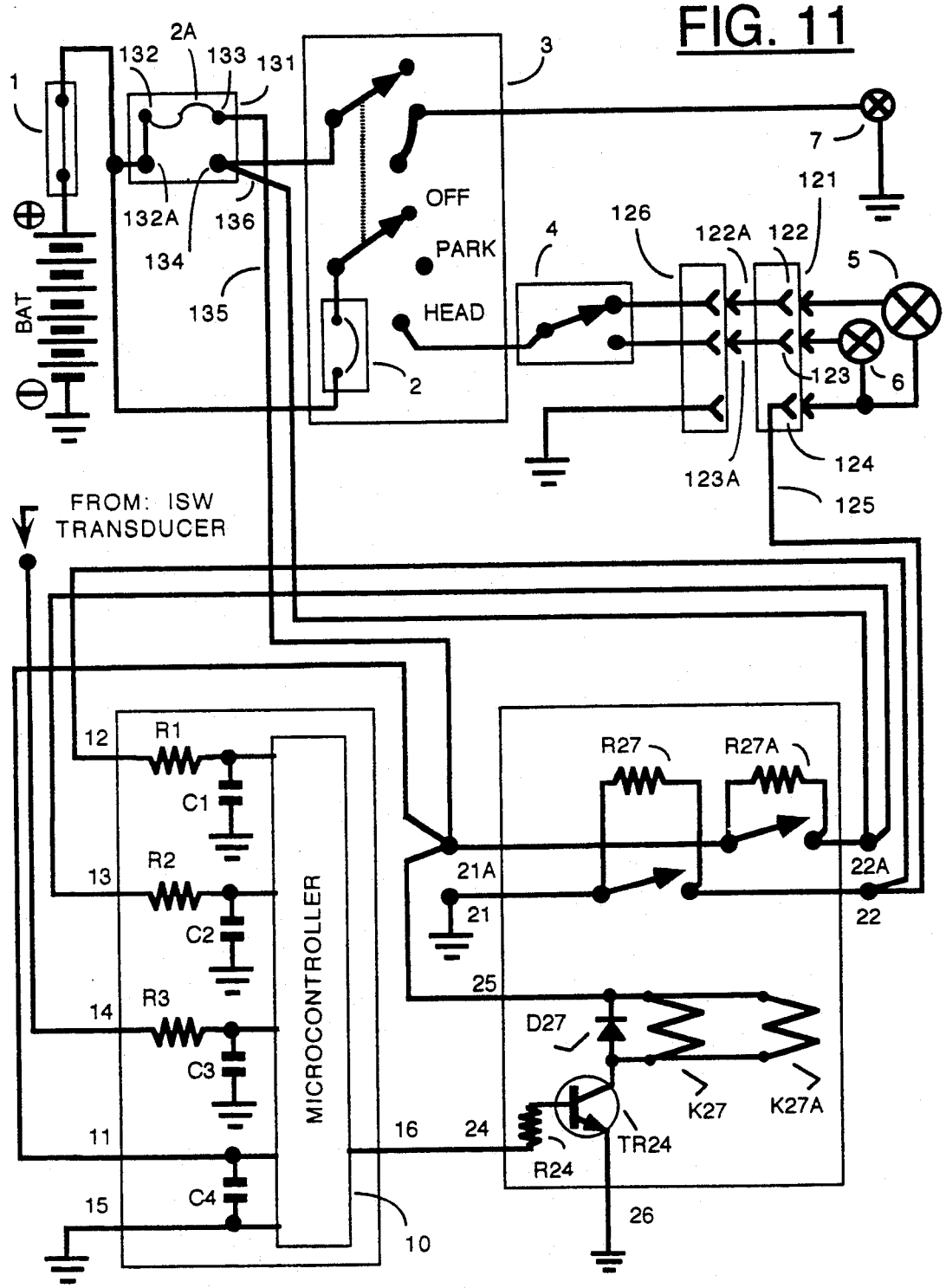
FIG. 11 represents the universally applicable wiring diagram for the embodiment of the invention destined for the retrofitting market.

Description/Operation of Electrical Wire Insert Means, Electrical Wire Interrupting and Signalling Means As mentioned above, one object of the invention is to provide an attachment for retrofitting onto existing cars, the installation thereof would not need the cutting and splicing of any pre-installed electrical wires of said cars, nor the reaching for the electrical terminals on the housings or bodies of the light switch and of the ignition switch. The most difficult but very popular environment where the invention has to satisfy this object is an environment as depicted in FIG. 1 now included in FIG. 11, where the branch that powers the head lights is protected by a self-resetting circuit breaker 2 housed in the main light switch body. The circuit of FIG. 11 will be used for illustrating the way the invention would interrupt the different circuits to create electrical wire insert means to allow electrical wire interrupting means to insert controlled switch means and provide the sensing of the logical states of the light switch and the ignition switch without compelling the installation to access difficult-to-reach terminals of those switches. Once the basic process is understood, it is easy to extend that process to other environments depicted in FIGS. 2 and 3 as well as their minor variations. As seen in FIG. 11, the general circuit of the lighting system is protected by a fusing link 1 connected to the high potential of the vehicle. From there, the branch that powers the head lights is further protected by a self-resetting circuit breaker 2 hidden in the main light switch body; and the branch that powers the park lights is protected by a fuse 2A. The head lights made in the environment are energized in the most basic, universal case, by a combination of a position of the main light switch 3 designated as the HEAD position in series with a single-pole, double-throw latching switch 4, called commonly a dimmer switch because of the fact that it allows the head light energizing to be latchably switched alternately from a high-power, far-distance beam set 5 called high beam of the head lights to a dimmer, less powerful, nearer-distance beam set 6 called low beams of the head lights. Again, the term light switch is to mean the combination of the just-described main light switch, and the dimmer switch plus the optional flash-to-pass switch where applicable. The detailed description/operation of this popularly available head light circuit with just the main light switch and a dimmer switch will be done first. After that, the effect of the added flash-to-pass switch option will be discussed.

Figure 12:
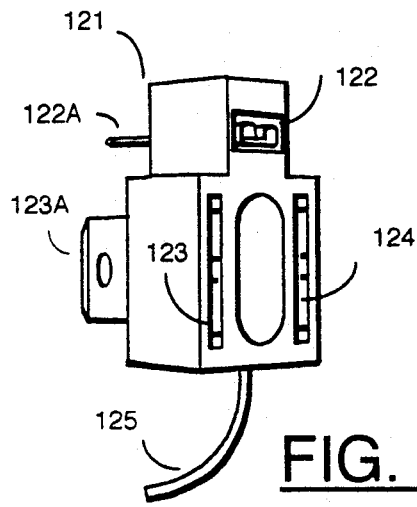
FIG. 12 and 12A shows the detail of the preferred embodiment of the head light socket insert.
Figure 12A:
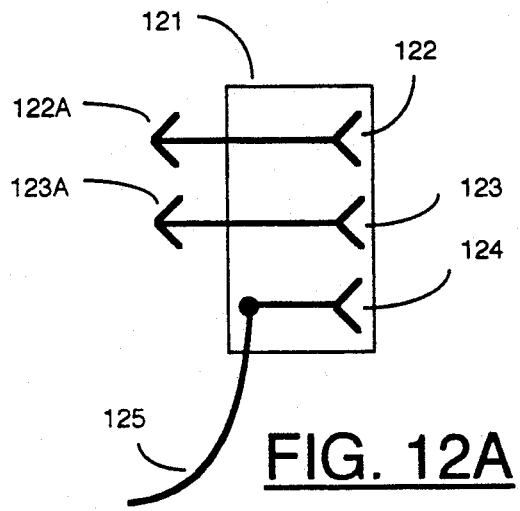

In this case of popular head light circuit, in order to be able to interrupt the head light circuits for insertion of a controlled switch means without cutting any pre-installed wires, nor having to access the electrical terminals of the light switch the invention proposes a novel electrical wire insert means in the form of head light socket inserts. FIG. 12 hows in perspective one of those head light socket inserts, 122, for a head light that houses both the low-beam and the high-beam filaments in the same enclosure, and FIG. 12A shows its schematic diagram. In each of these inserts, while all the other wires are made continuous via the male tab terminals 122A and 123A connected respectively to female receptacles 122 and 123, the common wire, (well identified as connected ultimately to ground in FIG. 1, but could be to high potential if the two sets of filaments 5 and 6 of FIG.3 share the same protecting fuse 2CA or 2BA), going to the high beam and to the low beam filaments of each head light is disconnected in the insert, and comprises only of a female receptacle 124 destined to receive the common male tab terminal of the head light. This receptacle 124 is connected to a wire 125 to be connected as in FIG. 11, wherein contact terminal 21 of the relay is connected to the chassis ground or ground potential, while contact terminal 22 of said relay is connected to wire 125. Wire 125 and the chassis of the car are parts of an electrical wire interrupting means that allows a pair of contact terminals of the control switch means to be inserted in series with the path that energizes the head lights when closed by all switches in series with that path. Wire 125 represents actually schematically two wires coming from the right and left head light socket inserts in the case where the car originally has two head lights, and four wires coming from two fight head light inserts and from two left head light inserts, in the case where the car has four head lights, originally. In this latter case of four head lights, the high-beam on each side of the car has two filaments: one is in the same first housing with the low-beam filament of that side and one is in a second housing located near said first housing. The filament of this second housing is terminated with two male tab terminals, of which one is to be connected to ground originally through its mating connector which has two female receptacles. Two head light inserts for these two extra second housings on the right and on the left of the car would be made very similar to insert 122, except that there will not be the presence of male tab terminal 122A and female receptacle 122. In FIG. 11, there is shown schematically the usual head light socket 126 with its typical three female receptacles. In this embodiment of the invention, head light socket 126 is to be removed from the three male tab terminals of its correspondent combination head light consisting of filaments 5 and 6. Head light socket insert 122 then is to be removably inserted in series between said socket 126 and said three male tab terminals of said combination headlight. It is to be understood that a total of two or four head light socket insert connections is represented schematically in FIG. 11 by a single connection for the sake of clarity in reading the schematic diagram.

Figure 13:
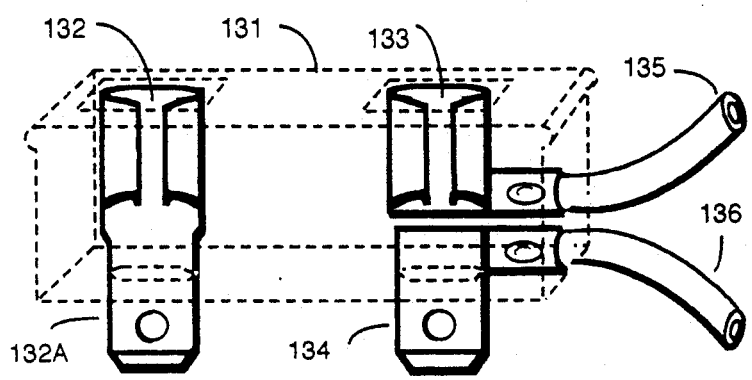
FIG. 13 shows the details of the preferred embodiment of a specific fuse socket insert.

To interrupt the circuit of the park lights without cutting any pre-installed wires, it is easier to make the electrical wire insert means as an insertion via a fuse socket insert 131 as in FIG. 13, to be inserted into the socket that used to receive fuse 2A, which is now removed from its original socket and re-inserted in the female receptacles 132 and 133 molded preferably into the plastic housing of fuse insert 131, which would play the protecting role of fuse 2A and provide the insertion of a pair of contact terminals of a controlled switch.

So, as seen in FIG. 11, the controlled switch means in this case of vehicle environment would need a relay with two pairs of contact terminals and would be the equivalent of a double-pole, single-throw, normally-open relay as described above and the electrical wire insert means and electrical wire interrupting means of the invention comprises:

a. a number of similarly made head light socket inserts equal to the number of head lights of said vehicle; each particular head light socket insert including a mating block 121 preferably made of insulating plastic designed to be inserted and secured mechanically between a particular head light socket and a set of male tab terminals on a particular head light; said set of male tab terminals on a particular head light being originally the detachable mating connector means of a set of female receptacles molded integrally in said particular head light socket; said mating block including therein electrical continuity, up to and including said particular head light terminals, in the electrical paths designed to be connected by said light switch eventually onto a first polarity of said battery (said vehicle high potential, in FIG. 11 ), said electrical continuity being done by means of at least one combination of a male tab terminal such as 123A in series with a female receptacle such as 123 and integrally molded in suitable orientations in said mating block; said mating block causing therein an electrical discontinuity in the electrical ground wire leading up to the ground female receptacle of said particular head light socket; said discontinuity being done by connecting said ground female receptacle of said particular head light socket to nothing; a new electrical path 125 between said first contact terminal 22 of said relay and said particular head light ground male tab terminal being further created by integrally molding a special female receptacle 124 into said mating block and attaching it to an electrical wire means departing therefrom, said special female receptacle being so oriented as to be detachably plugged onto said particular head light ground male tab terminal; said second contact terminal 21 of said relay being connected electrically to said vehicle ground; and b. a specific fuse socket insert including a mating form 131 preferably made of insulating plastic of suitable hardness, to be inserted and secured mechanically between a specific fuse 2A detached from its specific fuse socket and said specific fuse socket itself, said mating form 131 including thereon a pair of adapter fuse male terminals 132A and 134 to be plugged into said specific fuse socket, and an adapter mating fuse socket having two female receptacles 132 and 133 therein to receive in turn said specific fuse 2A, said mating form 131 including further three electrical connections: one connection, preferably molded in said mating form, between one of said adapter fuse male terminals, 132A, on the side electrically nearer to said high potential, that is to say, on the side of said specific fuse which is connected directly to the high potential by a simple electrical wire or fusing link but not through a power consuming device such as a light filament and the first female receptacle 132 of said adapter mating fuse socket; a second connection 135 between the second female receptacle 133 of said adapter mating fuse socket and said third contact terminal 21A of said relay; and a third connection 136 between the remaining terminal 134 of said adapter fuse male terminals and said fourth contact terminal 22A of said relay, said adapter fuse male terminals and said adapter mating fuse socket female receptacles matching the male terminals and female receptacles means adopted originally for said specific fuse and said specific fuse socket, and said specific fuse being identified by means of a wiring diagram of said vehicle as the fuse protecting the energizing path of said set of park lights. Connections 135 and 136 are defined as parts of the electrical wire interrupting means that allows the pair of contact terminals 21A and 22A of the control switch means to be electrically connected to a wire insert means which is the specific fuse socket insert, and to insert ultimately the contact terminals pair 21A and 22A in series with the energizing path of the park lights.

Description/Operation of the Light Switch Transducer Means

In FIG. 11, preferably, the most easily accessible transducer means of the state of said light switch includes:

sensing resistors R27 and R27A, each connecting a pair of contact terminals of an equivalent of a double-pole, single-throw, normally-open relay; the resistance of each of said sensing resistors being chosen to be practically infinite compared to the resistance of any of said lights; said sensing resistors being shown shortly to be parts of the electrical transducer means of the light switch transducer means that will provide the logical state of the three positions of the light switch without requiting the difficult access to the electrical terminals on the light switch;

a primary electrical connection by wiring means, serving as a part of electrical wire signaling means, between said first contact terminal 22 of said relay and a primary input 12 of the sensing input means, serving as another part of electrical wire signaling means, of said control block, a secondary electrical connection by wiring means between said fourth contact terminal 22A of said relay and a secondary input 13 of the sensing input means of said control block, and a tertiary electrical connection by wiring means between said easily accessible transducer means of the state of said ignition switch and a tertiary input 14 of the sensing input means of said control block;

a. whereby, in case 1 when said light switch is in the OFF position, said primary input would sense a logic low and said secondary input would sense a logic high by virtue of no current flowing in said sensing resistors R27 and R27A, and of the fact that practically no current flows into or out of the inputs 12 and 13 of the microcontroller as it is made of the well known CMOS technology;

b. whereby, in case 2, when said light switch is in the PARK position, said primary input would sense a logic low as before but said secondary input coming from contact terminal 22A of the relay would sense a logic low now because of the voltage dividing effect causing this secondary input to see a voltage equal to the high potential (for example, 12 volts), multiplied by a ratio of the equivalent resistances of all the park lights 7 in parallel (about 1.5 ohms in practice), to the total of this equivalent resistance (about 1.5 ohms as said), plus the resistance of R27 A (for example, 2 megohms). This calculated voltage is 0.0000089 volt; that is practically zero volt, or low level as far as the logic goes;

c. whereby, in case 3, when said light switch is in the HEAD position, said primary input, connected to contact terminal 22 of said relay would sense a logic high by the voltage dividing effect now applied to resistor R27 (for example, 2 megohms), and the equivalent resistance of the set of head light filaments 5, (assuming the dimmer switch is latched to high beams as in FIG. 11, this equivalent resistance is about 1.1 ohms in practice; if the dimmer switch was latched to the low-beam filament set 6, this equivalent resistance would have been about 1.6 ohms). The calculated voltage for this case at the terminal 22 is 11.999993 volts, (or would have been 11.999990 volts if the dimmer switch was latched to the low-beam filament set); that is practically 12 volts, or high level, as far as logic goes. In this case, said secondary input would sense a logic low, also by voltage dividing effect as explained just now in case 2;

d. whereby, in all cases, said tertiary input, being connected electrically to the ignition switch transducer means by electrical wiring means serving as another part of electrical wire signaling means, and being independent from the states of said light switch, would sense a logic level when said ignition switch is in the STOP mode and would sense another distinctly different logic level when said ignition switch is in the RUN mode; thus, in combination with logic processing means and memory means of said control block being programmed with a suitable algorithm to capture consistently a logic value as a state of the light switch or as a state of the ignition switch, would provide the information on the present and on the past states of the position of said light switch and of the mode of said ignition switch;

e. whereby, when said relay coil is energized, the energizing of said vehicle head and park lights in conjunction with said light switch would take place exactly as if there were no modifications whatsoever made for the invention;

f. whereby, when said relay coil is de-energized, the flow of current in said head and park fights, regardless of the position of said light switch, would be reduced to zero (in the case when the light switch is in the OFF position ), or to predetermined small levels (in the cases when the light switch is in PARK or a combination of main light switch and a dimmer switch to energize the high beam or low beam set of said head lights), limited by a combination of said first and second sensing resistors of said relay. These predetermined small levels of current consumption would occur when a a set of energized head lights or park lights is to be automatically de-energized by this invention, when the relay coil is already de-energized by the controlled output means while the light switch is still in the PARK or HEAD positions. Even in the worst case, when the main light switch is in the HEAD position and the dimmer switch latched into the high beams, the calculated current would be about 12 microamperes, using the values of above practical examples. It is obvious that, by themselves, these levels of current consumption would be calculated to consume only about a third of the smallest battery energy after a hundred years; thus, drawing only energy from said vehicle battery in a manner which is insignificant, harmless and would not be understandably detrimental to the normal operation of said vehicle thereafter.

Figure 11A:
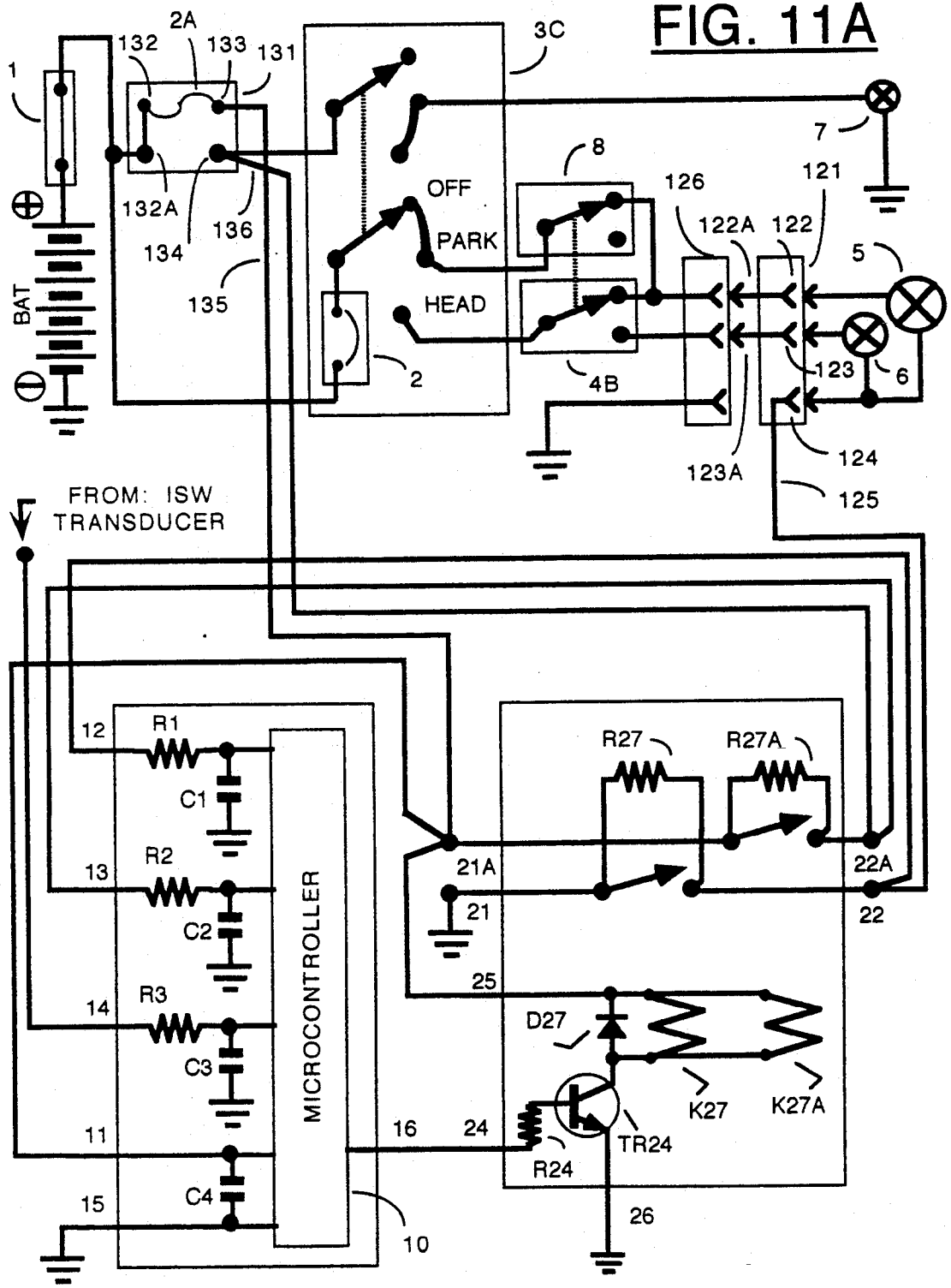
FIG. 11A illustrates the wiring diagram of FIG. 11 fitted with a flash-to-pass switch.

In the group of vehicles where the optional flash-to-pass switch assembly as depicted in FIG. 4, is part of the light switch of the light wiring system of the environment represented in FIG. 11, it would simply modify FIG. 11 into FIG. 11A, where the main light switch 3, the dimmer switch 4 of FIG. 11 are replaced respectively by the modified main light switch 3C, and the combination of switches 8 and 4B. In this environment, the main light switch 3C is very similar to the main light switch 3D of FIG. 4, except 3C now contains circuit breaker 2 therewithin to duplicate circuit breaker 2 of FIG. 11. Notice the presence of the connection between the OFF and PARK position in the modified main light switch 3C, similar to that of FIG. 4. Referring to FIG. 11A, it is easy to appreciate now that the logical significance of the action of the flash-to-pass switch assembly, when flickered to turn on the high-beam during the time when the modified main light switch 3C is in the PARK position, is simply to put this embodiment of the invention exactly in the same logical case 3 above when the schematic diagram of FIG. 11 was discussed. However, the logical significance of the action of the flash-to-pass switch assembly, when flickered to turn on the high-beam during the time when the modified main light switch 3C is in the OFF position, is to put this embodiment of the invention in a new case 4 beyond what is possible with the wiring of FIG. 11, and proper only to the wiring of FIG. 11A. That is the case where only the high-beams of the head lights are supposed to be turned on, without the park lights also being turned on as in case 3. In the preferred logic for the invention, the sensing of any light being turned on by the global action of the light switch consisting of the main light switch, the dimmer switch and the flash-to-pass switch is sufficient to energize the relay which has one or several pairs of contact terminals ganged to be on or off together. Consequently, the algorithm of the microcontroller as used for FIG. 11, as well as all the wire interrupting means and signalling means apply directly to FIG. 11A.

Description/Operation of the Transducer Means of the Ignition Switch States

Figure 7:
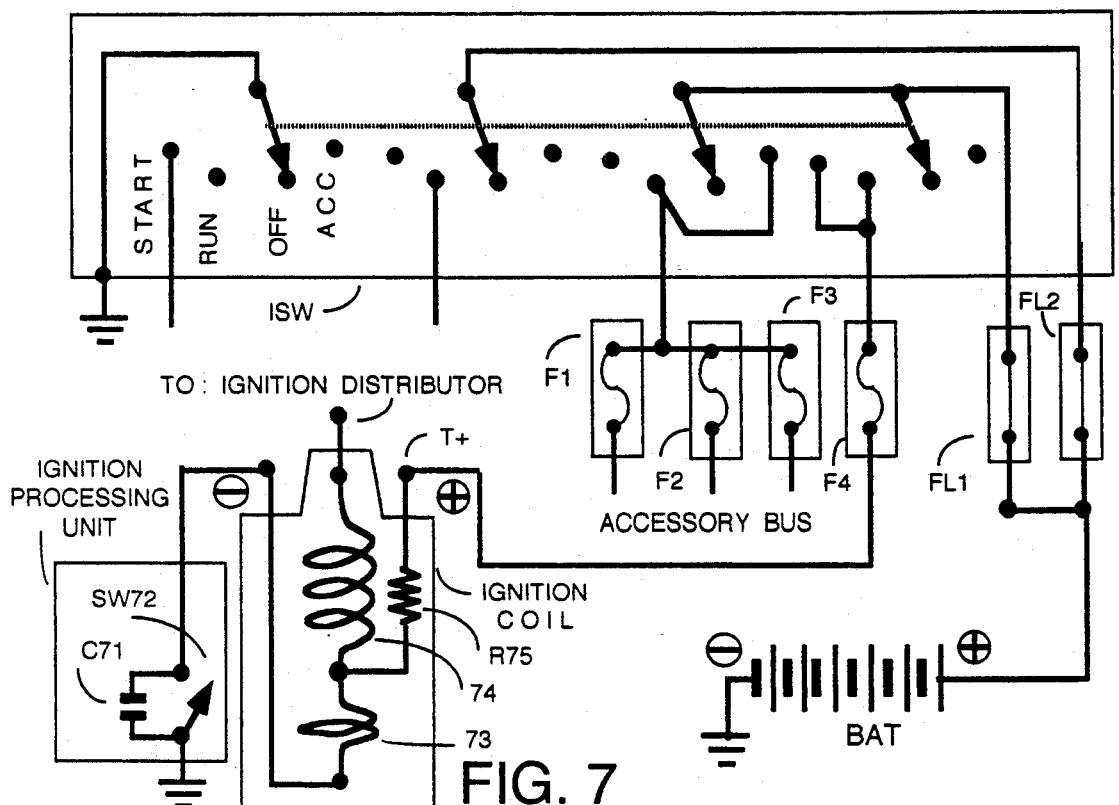
FIG. 7 through FIG. 9 depict different examples of transducer means that would yield information on the ignition switch more conveniently than direct connections at the ignition switch contacts themselves.
Figure 14:
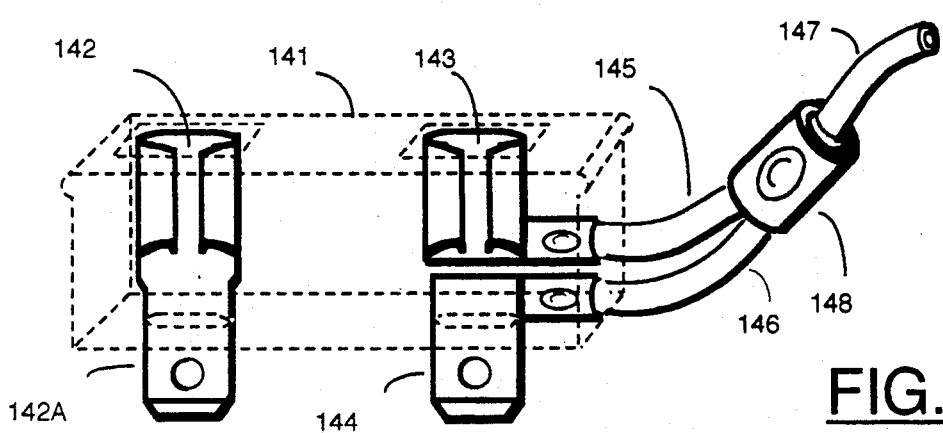
FIG. 14 shows the details of the preferred embodiment of an accessory fuse socket insert.

To provide the information as to whether the ignition switch is in the RUN mode or not, and without being compelled to have access to the difficult-to-reach terminals on the ignition switch body itself, the invention makes use of one of the general classes of transducers which yield perfectly, or in a just-a-little-less-than-perfectly useable manner, the wanted information in the form of a logical value to be fed to the tertiary input 14 of the sensing input means of the control block of the invention. The logic level coming from one of these general classes of ignition switch transducers is labelled as FROM: ISW TRANSDUCER in FIG. 11 and the following others, where applicable. FIG. 7 shows the schematics diagram in which the ignition switch ISW is included in the part which is relevant to the provision of the perfect transducers of the ignition switch states. In virtually every car built heretofore, it is easy to trace to at least a fuse in the fuse compartment of the car the presence of the high potential of the car when the ignition switch is turned to the RUN or ACC modes whether the car engine is running or not; and this presence of the high potential of the car on such a fuse is non-existent when the ignition switch is in the STOP mode. Such a fuse can be electrically connected into to provide a convenient transducer means for the STOP mode if suitably conditioned as below. This transducer means would provide the logical state of the presence of the STOP mode if the ignition switch is in the STOP mode, and the logical state of the non-presence of the STOP mode if the ignition switch is in the RUN or ACC mode. At this STOP time, if the accessory connected to such a fuse is turned ON by its own ON/OFF switch the logic level seen by a high-input-resistance sensing internal of the microcontroller would be the logic level of ground; if said accessory is turned OFF by its own switch, this logic level would be not ground nor high potential. A suitable resistor to ground at the sensing input of the microcontroller would defined definitely this logic to be ground. Such a fuse is depicted in FIG. 7 as any of the fuses F1, F2 and F4 which feed electrical power onto several lines of accessories of the car. Those lines of accessories are called commonly the accessory bus of the car, and those fuses such as F1, F2 and F3 are called accessory fuses. To make a connection between one of these accessory fuses and the tertiary input 14 of the sensing input means of the control block of the invention without having to do any soldering or wire splicing, a fuse socket insert 141 depicted in FIG. 14 is proposed by this invention. It is clear from FIG. 14 that this fuse socket insert 141 is derived directly from the fuse socket insert 131 of FIG. 13 already described above, with the wires 145 and 146 being spliced during the manufacturing into a single wire 147 with a suitable splicer 148. At installation time, if accessory fuse F1 was recommended by the installation instructions to be used as the ignition transducer for the invention on a certain model of car, then the installer just would remove accessory fuse F1 from it original fuse socket, plug fuse F1 male tab terminals into the female receptacles 142 and 143 of fuse socket insert 141, and finally plug the male tab terminals 142A and 144A of fuse socket insert 141 into the original socket of accessory fuse F1. It is obvious that, for any desirable reasons, fuse socket insert 141 can be made during manufacturing by an electrical connection between male tab terminal 144 and the female receptacle 143 inside of the molded body of 141 and a single wire, for instance 145, would exit the molded body of 141 and continue into wire 147.

The second perfect transducer for the ignition switch states depicted in FIG. 7 is the circuit related to the ignition coil feeding from the high potential of the car. Again, it is very easy to trace—especially with a schematic diagram made commonly available to the public—the line protected by a fuse and connected only to a terminal marked in general with a + sign on the body of the ignition coil of a car, when such an ignition coil body is not buffed out of sight in one big computer controlled block as in some recently built cars of the world. In FIG. 7, there are two electrical points concerning the ignition coil which can be tapped into to be used as transducer means for the ignition switch state: the protecting fuse F4 for the ignition coil circuit, found usually in the fuse compartment of the car, and the electrical terminal T+, nearest a location marked usually with a + sign on the body of the ignition coil, which is usually located under the hood of the car. In FIG. 7, capacitance C71 and breaker point SW72 located in the box marked with Ignition Processing Unit represent schematically the unit that causes variations in the current in the low-voltage coil 73 of the ignition coil that receives the battery voltage through resistor R75—called a ballast resistor serving to limit the induced current in each ignition wire to a non-lethal current in case someone touches it when in operation—in order to induce a very high voltage with respect to the chassis of the car(of the order of 40 kilovolts), into the coil 74 which has a tremendously higher number of turns compared to coil 73. This Ignition Processing Unit can be simply an electrical contact that mechanically makes and breaks in synchronization with the rotation of the car's engine in the old technology, or replaced by a transistor thereof the collector and emitter are inserted as breaker point SW72 and the base current is controlled by an electrical contact that is mechanically or magnetically caused to make and break in synchronization with the rotation of the car's engine in more recent technology under the control of a computer unit under the hood called commonly the engine command module. When the like of fuse F4 of FIG. 7 is chosen as the transducer of the ignition switch states, to make a connection between this fuse and the tertiary input 14 of the sensing input means of the control block of the invention without having to do any soldering or wire splicing, a fuse socket insert 141 depicted in FIG. 14 is again proposed by this invention. The way this fuse socket insert is used is similar to the way it is described for that of fuse F1 described above. If terminal T+ on the ignition coil body is chosen to be the transducer means for the ignition switch states, to make a connection between this terminal T+ and the tertiary input 14 of the sensing input means of the control block of the invention without having to do any soldering or wire splicing, it suffices in general to unscrew slightly a machine nut on this terminal T+ that retains the original spade terminal which is crimped on the wire coming from the fuse F4, and to insert a second spade terminal under this nut along with the other spade terminal before tightening this nut down again. This second spade terminal is already crimped during manufacturing onto a wire to be connected ultimately to the tertiary input 14 of the sensing input means of the control block of the invention.

Figure 8:
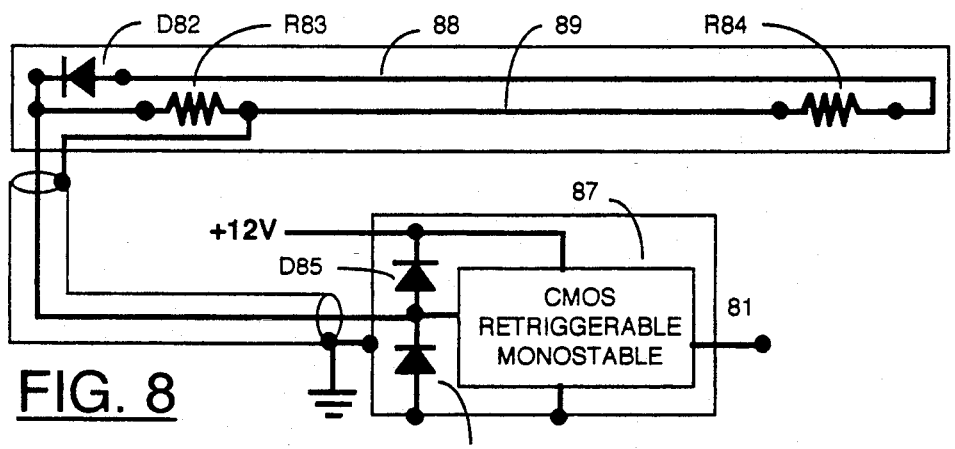

Another option of providing the transducer means of the ignition switch states is depicted in FIG. 8. In this option an idea that works is to capture the electromagnetic induction coming from one of the ignition wires going to the spark plugs of the engine of the car or from the wire between the ignition coil and the distributor of the engine of that car. To capture efficiently this electromagnetic induction and process it into a distinguishable logic level when the engine is not running, and into another differently distinguishable logic level when the engine is running, it is determined by experimentation that the option can use an elongated, flexible cylindrical plastic tubing assembly of about eight to ten inches of length, and about a quarter-inch of diameter, secured along one of the above identified ignition wires and containing inside on most of its length the wires 88 and 89 connected with resistors R83 and R84 and diode D82 as in FIG. 8. With the polarity of diode D82 oriented as shown, R83 chosen to be about a quarter to one megohm, and R84 about 4 to 10 Kohm, positive spikes synchronous with the rotation of the engine can be found at the point between dimes D85 and D86 in FIG. 8. These two diodes D85 and D86 are there to limit the amplitude of these spikes to between about −0.6 volt to +11.4 volts at any speed of rotation of the engine, and channel these spike to the triggering of the CMOS retriggerable monostable flip-flop 87. CMOS technology is recommended for 87 to reduce its permanent current consumption to the order of tens of microamps or less. It is recognizable by anyone well versed in the art that if the retriggerable monostable flip-flop 87 is built with a time constant greater than the lowest rate of repetition of the spikes at its input, it will continue to stay at the triggered state at its output 81, as long as the spikes continue to arrive at its input, which, in this case of FIG. 8, is that as long as the engine is running and inducing these spikes into the input of the monostable flip-flop. As soon as the engine stops running for a small fraction of a second, this monostable flip-flop will revert to the second state, which is the rest state, or non-triggered state at its output 81. If this option of transducer is chosen, a wire will connect this output 81 to the tertiary input of the sensing input means of the control block of the invention. Notice that the input of the CMOS retriggerable monostable with it clamping diodes D85 and D86 can be actuated the same way as just described with the voltage coming out of a voltage divider, composed of two suitably chosen resistors, to get a voltage of about 12 to 30 volts out of the high voltage, picked off directly with a suitably made insert, from an ignition wire going to a spark plug on the vehicle. The clamping diodes D85 and D86 will clamp this voltage to a level between −0,6 and +11.4 volts with respect to ground for the correct triggering of the monostable 87 as explained above.

Figure 9:
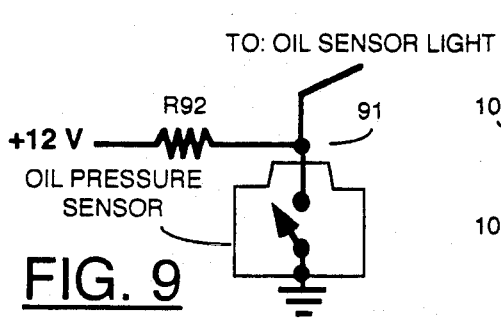

Yet another option of transducer means for the ignition switch states is depicted in FIG. 9. On virtually every car built up until now, there is an oil pressure sensor mounted somewhere on the crankcase of the engine which, in its most basic form, is an electrical switch which is normally closed when the pressure on one of its surfaces exposed to the inside of the crankcase where the pressure is to be sensed is a low pressure, below a certain designed value proper to the sensor. This low pressure is normally the pressure on said sensor surface when the engine of the car is at rest. This electrical switch is designed to open as soon as said pressure is a high pressure, above said certain designed value proper to the sensor. This high pressure is the one that is created when the engine of the car is running, and it will drop to a low pressure if the level of oil in the crankcase becomes lower than a permissible value. Terminal 91 of the oil sensor in FIG. 9 is usually connected to a light illuminating a small red transparent window marked OIL. This light is wired to turn on when the ignition switch is first turned to the RUN position but not to the position that would start the engine of the car yet. This provision is to help the user of the car to ascertain that the oil sensor light is in working condition, and would probably turn on to warn the user in a correct manner if the pressure to be sensed by the oil pressure sensor is lower than permissible, or in a correlated manner, if the oil level in the crankcase of the engine is lower than permissible, during the time when the engine is to be started and running after this diagnostics time. Except for the time when the oil level in the crankcase is left to be too low as to turn on this warning OIL light when the engine is running, terminal 91 of the oil pressure of the car, when it is easy to access, can serve as the transducer means for the ignition switch states for the purpose of the invention if a wire is connected between terminal 91 and the tertiary input of the sensing input means of the control block of the invention. As seen easily in FIG. 9, terminal 91 would have the ground potential when the engine is not running and would have the high potential when the engine is running. To assure that these two logic levels are always usable regardless of whether the filament of the OIL warning light is in good condition or is broken, a resistor connected to the high potential at said tertiary input as represented in FIG. 9 by R92. Connected that way, R92, which can be of a wide range of values, would make terminal 91 to have the high potential as soon as the switch of the oil pressure sensor opens.

Among the obvious general subclasses comprising these four options of transducer means for the ignition switch states each one has its own merits, and when the invention is applied to different environments of car electrical wiring systems, one will be decided upon to have the best merits for each environment, and, if necessary, the programming of the microcontroller of the control block of the invention concerning said tertiary input will be done accordingly to accommodate the particular logic level representing the RUN mode of the ignition switch in that particular option of transducer means. It is conceivable that the general classes of specialized transducer means for the ignition switch states can be extended to several others, for example, transducers which process the sounds or the vibrations of a running engine under the hood of a car into the logic level meaning that the engine of the car in question is running, and the absence of such sounds or vibrations into the logic level meaning that the engine is not running. These transducer means beyond the four best and obvious options described above belong to the well established technology of transducers and will not be described here.

Description/Operation of the Embodiment in other Environments

Now that the wire interrupting and signalling means of the embodiment of the invention in the most difficult environment have been described in details above, it is easy to extend the understanding of the operation of the embodiment in some of the most common variations of environments before generalizing to all the possible variations encountered in the industry of car manufacturing.

Figure 15:
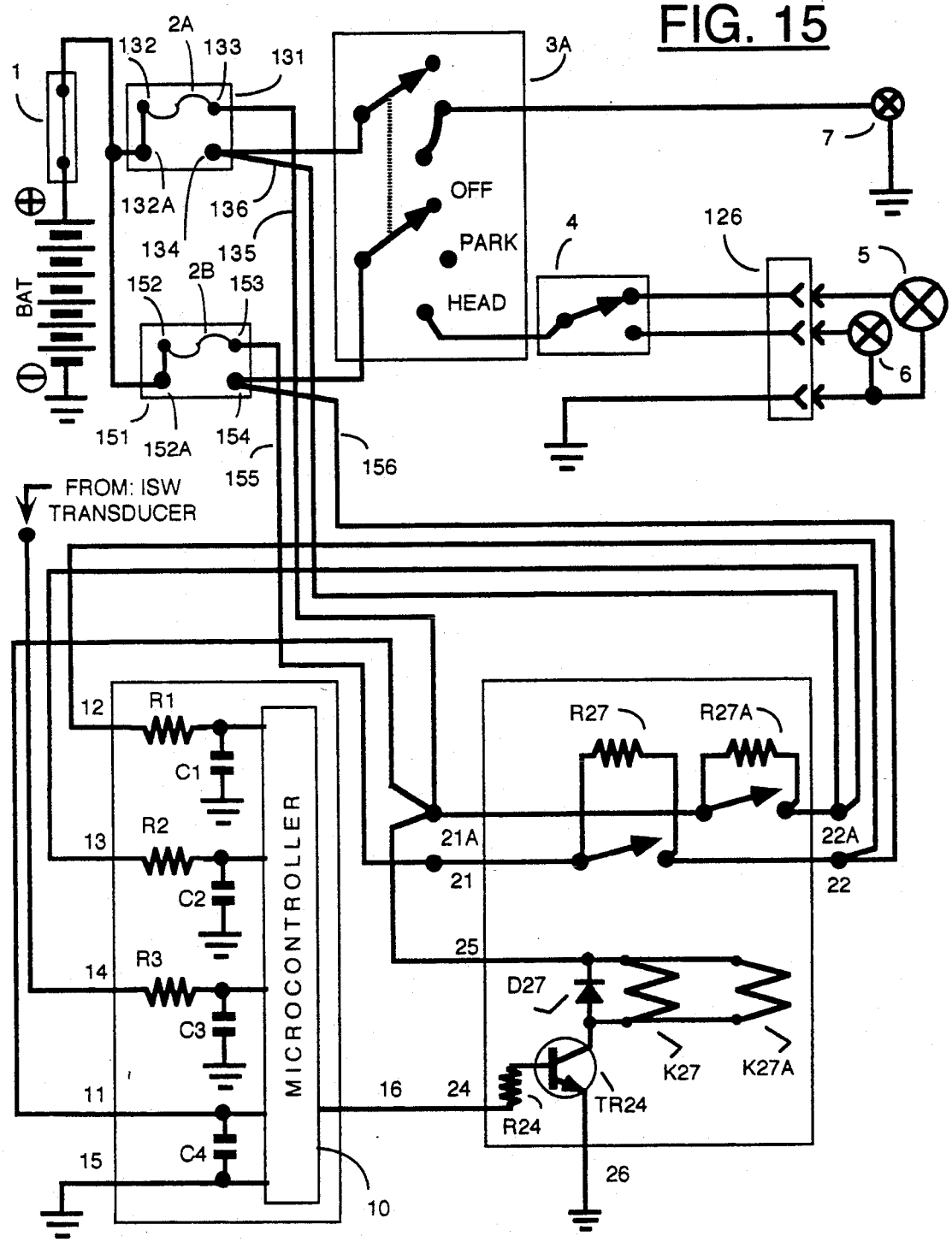
FIG. 15 represents a simpler wiring diagram compared to that of FIG. 11, in the situation where a fuse exits on the car to protect the head light circuit.

Referring to FIG. 15, it can be seen that the top part of the drawing is the schematic diagram of the prior art as depicted in FIG. 2 before, and the lower part is the embodiment of the invention as applicable to that vehicle environment. That vehicle includes a specific fuse 2A and a dedicated fuse 2B located in the easily accessible fuse compartment of said vehicle, said specific fuse 2A being designed to protect the path energizing said park lights and said dedicated fuse 2B being designed to protect the path energizing said set of head lights. Comparing FIG. 15 with FIG. 11, it is clear that many elements are the same and thus labelled with the same numerals. The elements which are slightly different in the two drawings are labelled with slightly different names, e.g., 3 for the main light switch in FIG. 11 containing the circuit breaker 2, and 3A for the main light switch without such circuit breaker in FIG. 15. Thus, in FIG. 15 the electrical wire insert means and electric wire interrupting means comprises:

a. a dedicated fuse socket insert including a fitting form 151 preferably made of insulating plastic of suitable hardness, to be inserted and secured mechanically between said dedicated fuse 2B detached from its dedicated fuse socket and said dedicated fuse socket itself, said fitting form 151 including thereon a pair of supplied fuse male terminals 152A and 154 to be plugged into said dedicated fuse socket, and a supplied fitting fuse socket having two female receptacles 152 and 153 therein to receive in turn said dedicated fuse 2B, said fitting form 151 including further three electrical connections: one connection, preferably molded in said fitting form, between one of said supplied fuse male terminals 152A on the side electrically nearer to said high potential and the first female receptacle 152 of said supplied fitting fuse socket; a second connection 155 between the second female receptacle 153 of said supplied fitting fuse socket and said second contact terminal 21 of said relay, and a third connection 156 between the remaining terminal 154 of said supplied fuse male terminals and said first contact terminal 22 of said relay, said supplied fuse male terminals 152A and 154 and said supplied fitting fuse socket female receptacles 152 and 153 matching the male terminals and female receptacles means adopted originally for said dedicated fuse and said dedicated fuse socket;

b. a specific fuse socket insert including a mating form 131 implemented exactly as described for the specific fuse socket insert 131 in FIG. 11, namely made preferably of insulating plastic of suitable hardness, to be inserted and secured mechanically between a specific fuse 2A detached from its specific fuse socket and said specific fuse socket itself, said mating form 131 including thereon a pair of new fuse male terminals 132A and 134 to be plugged into said specific fuse socket, and a new mating fuse socket having two female receptacles 132 and 133 therein to receive in turn said specific fuse 2A, said mating form 131 including further three electrical connections: one connection, preferably molded in said mating form, between one of said new fuse male terminals, 132A, on the side electrically nearer to said high potential and the first female receptacle 132 of said new mating fuse socket; a second connection 135 between the second female receptacle 133 of said new mating fuse socket and said third contact terminal 21A of said relay; and a third connection 136 between the remaining terminal 134 of said new fuse male terminals and said fourth contact terminal 22A of said relay, said new fuse male terminals and said new mating fuse socket female receptacles matching the male terminals and female receptacles means adopted originally for said specific fuse and said specific fuse socket, and said specific fuse being identified by means of a wiring diagram of said vehicle as the fuse protecting the energizing path of said set of park lights.

In FIG. 15, preferably, said easily accessible transducer means of the state of said light switch comprises:

sensing resistors R27 and R27A, each connecting a pair of contact terminals of said relay, the resistance of each of said sensing resistors being chosen to be practically infinite compared to the resistance of any of said lights;

a primary electrical connection by wiring means between said first contact terminal 22 of said relay and a primary input 12 of the sensing input means of said control block, a secondary electrical connection by wiring means between said fourth contact terminal 22A of said relay and a secondary input 13 of the sensing input means of said control block, and a tertiary electrical connection by wiring means between said easily accessible transducer means of the state of said ignition switch and a tertiary input 14 of the sensing input means of said control block;

a. whereby, in case 1 when said light switch is in the OFF position, said primary input would sense a logic high and said secondary input would sense a logic high by virtue of no current flowing in said sensing resistors R27 and R27A, and of the fact that practically no current flows into or out of the inputs 12 and 13 of the microcontroller as it is made of the well known CMOS technology;

b. whereby, in case 2, when said light switch is in the PARK position, said primary input would sense a logic high as before but said secondary input coming from contact terminal 22A of the relay would sense a logic low now because of the voltage dividing effect causing this secondary input to see a voltage equal to the high potential (for example, 12 volts), multiplied by a ratio of the equivalent resistances of all the park lights 7 in parallel (about 1.5 ohms in practice), to the total of this equivalent resistance (about 1.5 ohms as said), plus the resistance of R27A (for example, 2 megohms). This calculated voltage is 0.0000089 volt; that is practically zero volt, or low level as far as the logic goes;

c. whereby, in case 3, when said light switch is in the HEAD position, said primary input, connected to contact terminal 22 of said relay would sense a logic low by the voltage dividing effect now applied to resistor R27 (for example, 2 megohms), and the equivalent resistance of the set of head light filaments 5, (assuming the dimmer switch is latched to high beams as in FIG. 11, this equivalent resistance is about 1.1 ohms in practice; if the dimmer switch was latched to the low-beam filament set 6, this equivalent resistance would have been about 1.6 ohms). The calculated voltage for this case at the terminal 22 is 0.0000065 volt, (or would have been 0.0000095 volt if the dimmer switch was latched to the low-beam filament set); that is practically zero volt, or low level, as far as logic goes; in this case, said secondary input would sense a logic low, also by voltage dividing effect as explained just now in case 2;

d. whereby, in all cases, said tertiary input, being independent from the states of said light switch, would sense a logic level when said ignition switch is in the STOP mode and would sense another distinctly different logic level when said ignition switch is in the RUN mode; thus, in combination with logic processing means and memory means of said control block being programmed with a suitable algorithm to capture consistently a logic value as a state of the light switch or as a state the ignition switch, would provide the information on the present and on the past states of the position of said light switch and of the mode of said ignition switch;

e. whereby, when said relay coil is energized, the energizing of said vehicle head and park lights in conjunction with said light switch would take place exactly as if there were no modifications whatsoever made for the invention;

f. whereby, when said relay coil is de-energized, the flow of current in said head and park lights, regardless of the position of said light switch, would be reduced to zero (in the case when the light switch is in the OFF position), or to predetermined small levels (in the cases when the light switch is in PARK or a combination of main light switch and a dimmer switch to energize the high beam or low beam set of said head lights), limited by a combination of said first and second sensing resistors of said relay. These predetermined small levels of current consumption would occur when a a set of energized head lights or park lights is to be automatically de-energized by this invention, when the relay coil is already de-energized by the controlled output means while the light switch is still in the PARK or HEAD positions. Even in the worst case, when the main light switch is in the HEAD position and the dimmer switch latched into the high beams, the calculated current would be about 12 microamperes, using the values of above practical examples. It is obvious that, by themselves, these levels of current consumption would be calculated to consume only about a third of the smallest battery energy after a hundred years; thus, drawing only energy from said vehicle battery in a manner which would not be understandably detrimental to the normal operation of said vehicle thereafter.

Figure 15A:
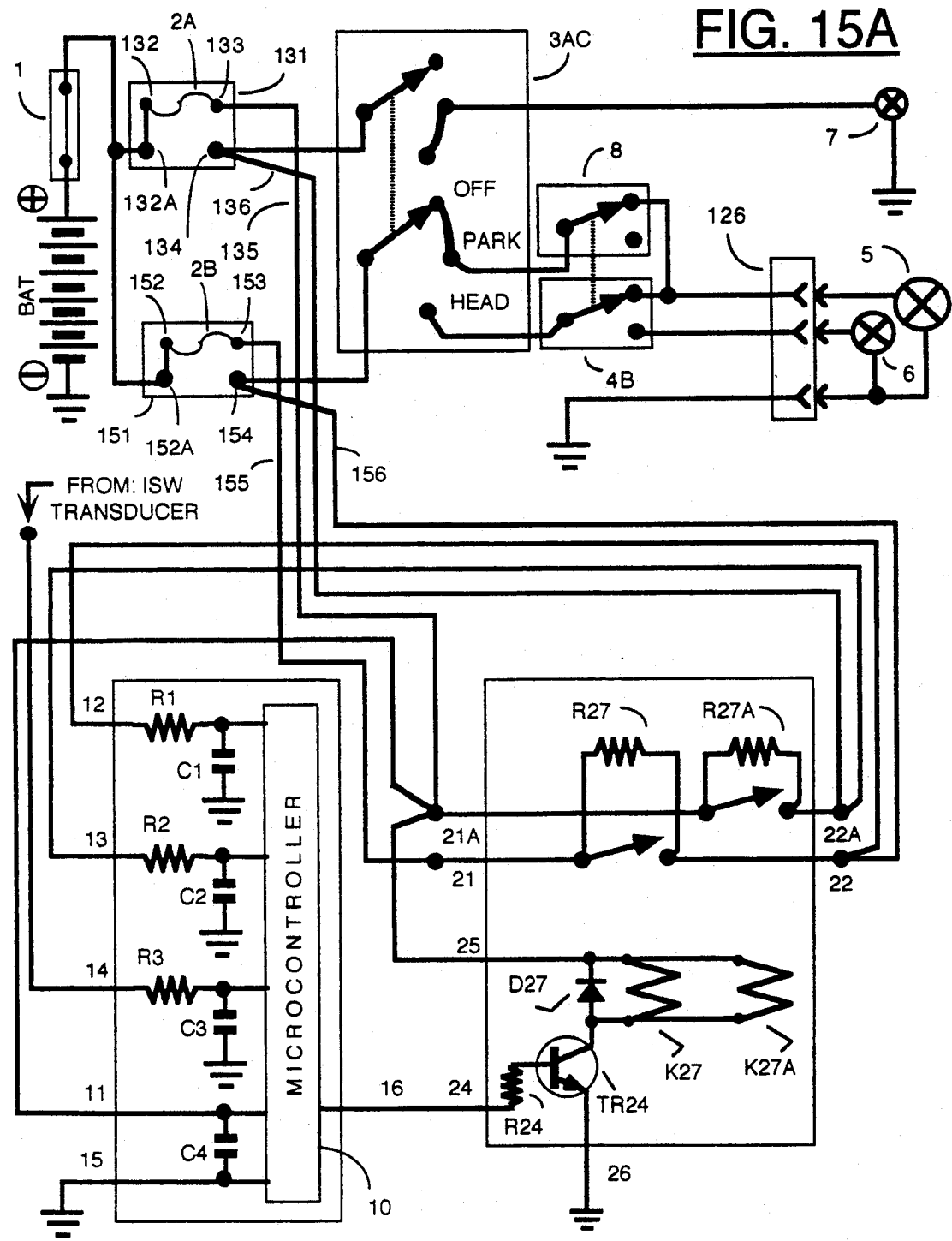
FIG. 15A illustrates the wiring diagram of FIG. 15 fitted with a flash-to-pass switch.

In the group of vehicles where the optional flash-to-pass switch assembly as depicted in FIG. 4, is part of the light switch of the light wiring system of the environment represented in FIG. 15, it would simply modify FIG. 15 into FIG. 15A, where the main light switch 3A, the dimmer switch 4 of FIG. 15 are replaced respectively by the modified main light switch 3AC, and the combination of switches 8 and 4B. In this environment, the main light switch 3AC is very similar to the main light switch 3D of FIG. 4. Notice the presence of the connection between the OFF and PARK position in the modified main light switch 3AC, similar to that of FIG. 4. Referring to FIG. 15A, it is easy to appreciate now that the logical significance of the action of the flash-to-pass switch assembly, when flickered to turn on the high-beam during the time when the modified main light switch 3AC is in the PARK position, is simply to put this embodiment of the invention exactly in the same logical case 3 above when the schematic diagram of FIG. 15 was discussed. However, the logical significance of the action of the flash-to-pass switch assembly, when flickered to turn on the high-beam during the time when the modified main light switch 3AC is in the OFF position, is to put this embodiment of the invention in a new case 4 beyond what is possible with the wiring of FIG. 15, and proper only to the wiring of FIG. 15A. That is the case where only the high-beams of the head lights are supposed to be turned on, without the park lights also being turned on as in case 3. In the preferred logic for the invention, the sensing of any light being turned on by the global action of the light switch consisting of the main light switch, the dimmer switch and the flash-to-pass switch is sufficient to energize the relay which has one or several pairs of contact terminals ganged to be on or off together. Consequently, the algorithm of the microcontroller as used for FIG. 15, as well as all the wire interrupting means and signalling means apply directly to FIG. 15A. The discussion about the ignition switch transducer as labelled ISW transducer when FIGS. 11 and 11A were referred to, applies directly to the ISW transducer of FIGS. 15 and 15A.

Figure 15B:
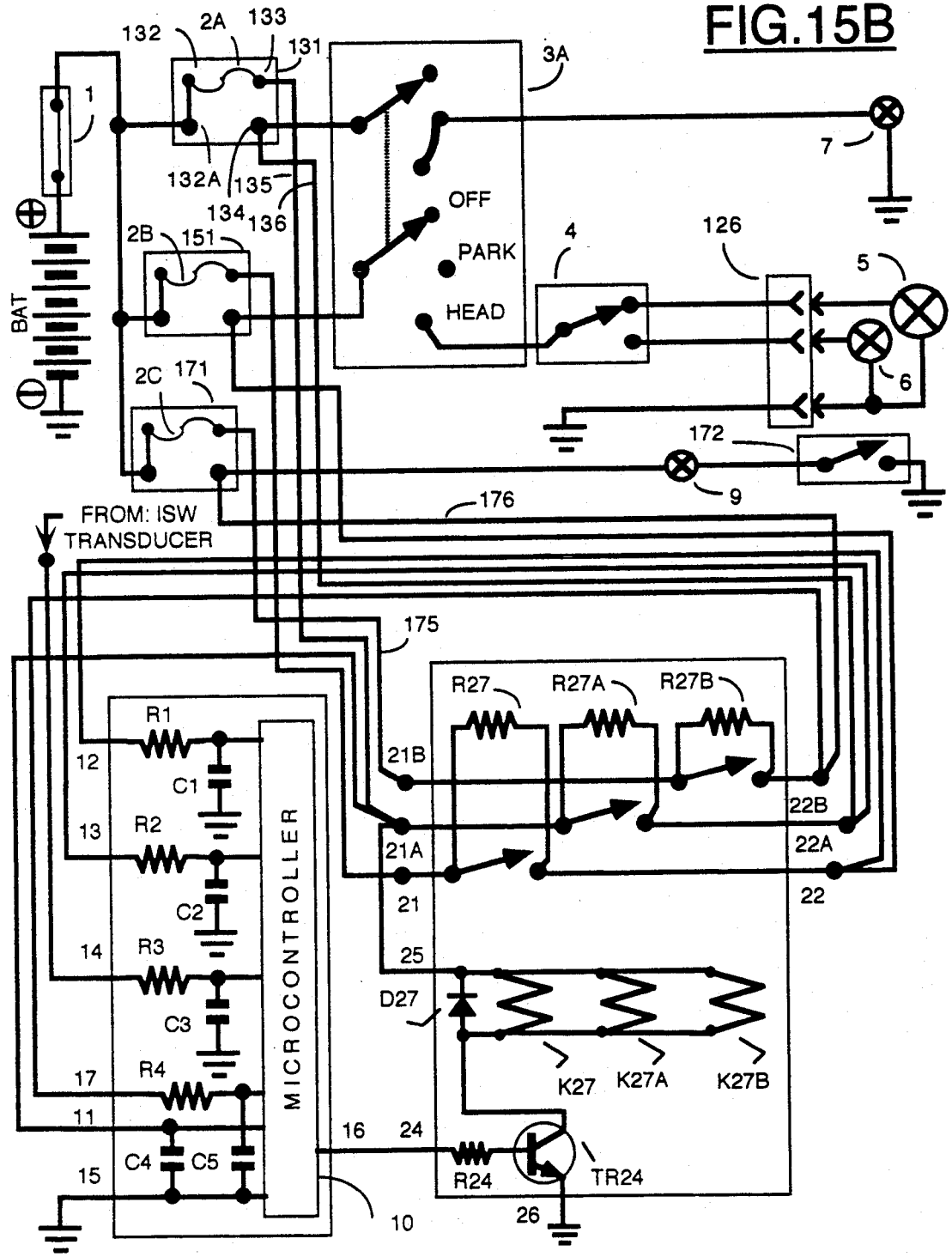
FIG. 15B represents a preferred wiring diagram similar to FIG. 15 but includes automatic switching for the dome lights.

In FIG. 15B there is illustrated a natural variation of the embodiment of the invention discussed in FIG. 15. The only differences here are the presence of some extra parts consisting of the fuse socket insert 171 for the dome light fuse (or dome fuse) 2C, the dome light 9, the dome light switch 172, the extra ganging relay K27B coil and its two contact terminals 21B and 22B, and the extra quaternary sensing input 17 consisting of resistor R4 and capacitor C5 on the microcontroller 10. Again, the addition of these extra parts to the embodiment of the invention applicable in the environment of FIG. 15 as seen in FIG. 15B is minimal but allows to provide the extra automatic switching of the dome light which tends to be easily forgotten once it is turned on manually by its principal dome light switch: there is absolutely no warning of any kind connected to this dome light, due to the fact that it has to light the interior of the car every time a door is opened, beyond the casual use during driving time for illuminating the interior of the car by the manual action on its principal dome light switch. This latter switch is generally located on the body of the main light switch of the vehicle, and is latched to close the dome light circuit or be in the ON position by turning the main light switch knob of the vehicle counterclockwise to its extreme until it clicks, and is latched to open the dome light circuit or be in the OFF position by turning the main light switch knob of the vehicle clockwise slightly until it clicks again. The installation of the extra parts to achieve the extra benefit concerning the dome light does not require at all the cutting and splicing of any pre-installed wires, nor the reaching of the terminals on the body of any light switch whatsoever. Referring to FIG. 15B, this object is achieved with the use of a fuse socket insert 171 made exactly as the fuse socket insert 131 described above, and to be inserted between fuse 2C and its own socket from which it was removed. Similar to and corresponding to wires 135 and 136 described for fuse socket insert 131 above, wire 175 coming from fuse socket insert 171 is here connected to the fifth contact terminal 21B, and wire 176 is here connected to the sixth contact terminal of the controlled switch means, with the additional sensing resistor R27B connected between these two contact terminals 21B and 22B. The controlled switch means is here equivalent to a triple-pole, single-throw relay. Fuse 2C is to be identified as the one protecting the dome light. Switch 172 is to be understood as the schematic representation of the principal dome switch on the main light switch body connected in parallel with at least two vehicle door-activated switches. Being connected in parallel, each of these door-activated switches independently will close the circuit or be in the ON position when the related door is opened, causing the dome light to be energized, and will open the circuit or be in the OFF position when the related door is closed, causing the energized dome light to turn off and stay off. The logic related to these dome light switches 172 connected in parallel is such that, when relay contact terminals 21B and 22B are closed, any or all of these switches when closed will energize the dome light, and said dome light will be off only when all of these switches are opened. Taking into account the fact that the resistance of dome light 9 is about 30 ohms and that R27B is again about 2 megohms, and turning the attention to the wire signalling means related to the contact terminals 21B and 22B when they are opened, it is easy to calculate that the logic level at the quaternary input 17 of the control block will see a high logic level when all switches 172 are opened, and will see a low logic level as soon as any or all of switches 172 are closed. The algorithm for the microcontroller of the control block in this embodiment of the invention can be simply the same as that adopted for the environment of FIG. 15, except that now the quaternary input 17 is actively used; thus, it can be seen that all the manual operations of said dome light are exactly as originally designed, and the automatic switching of said dome light in conjunction with said dome light switch and said ignition switch is the exact duplicate of the automatic switching of said park lights in conjunction with said light switch and said ignition switch. The algorithm is, again summarized in another manner, to cause the energizing the controlled switch means as soon as any (or all) of the inputs 12,13,14 and 17 is at the logic level meaning that one or several light switches are closed, manually or by the doors action. This energizing is to stay on if and while the ignition switch transducer logic level says that the ignition switch is in the RUN mode. If after any light is switched on by its own switch (or combination of switches) and the action of the controlled switch means when the ignition switch is sensed to be in the RUN mode, and then after that the ignition switch is turned to the STOP mode, the controlled switch means is to be energized (with blinking as explained above), for said short moment of time or until all the light switches are opened, which ever comes first. If after any light is switched on by its own switch (or combination of switches) and the action of the controlled switch means when the ignition switch is sensed to be in the STOP mode, the controlled switch means is to be energized (with another kind of blinking as explained above), for an extended period, (or as the user wants, for an extra-extended period of time), or until all the light switches are opened, which ever comes first. Notice the location of the wire interrupting means 21B and 22B of dome light 9 with respect to the global energizing path of this dome light and its switch 172. Comparing this wire interrupting means with those found on the two paths which energize the park and head lights of FIG. 11, one can see better the claim that this invention allows the controlled switch means to be suitably insertable at more than a single locations in series with the electrical path that serve to energize a set of lights of the vehicle. It is obvious that the embodiment of the invention illustrated in FIG. 15B can make use of any one of the general classes of ignition switch transducers, and can include the flash-to-pass switch without modifying anything in the discussion above for the most basic environment.

When a vehicle with the basic wiring as in FIG. 1 is being assembled on the factory lines or being brand new at the dealership, another attractive embodiment of the invention for automatic light switching can be envisioned as a last-minute option, just before delivery to the customer. The vehicle includes in this case a readily available opportunity to design one insertion into the electrical paths energizing the lights of said vehicle as shown in the schematic diagram of FIG. 16. Comparing this diagram of FIG. 16 around the electrical points 161 and 162 and that of FIG. 1, it can be seen that the insertion for the wire interrupting means of the invention can be made on the car assembly line for electrical wire bundles with one extra splicing physically just immediately after the now still unsoiled and easily identifiable fuse link 1. That extra splicing comes about as point 162 is to be spliced to wire 162A, and point 161 is to be spliced to wire 161A instead of the original splicing of points 161 and 162 together. If the insertion is to be done on a vehicle already at the dealership, the splicing would be done at two points 161 and 162 onto wires 161A and 162A after the original splicing between points 161 and 162 are identified (easily, since the wires are still unsoiled yet), and cut open first. For the rest of FIG. 16 it can be seen as follows:

a. said controlled switching means comprises of a normally-open, single-pole, single-throw relay having a coil K27 therein energizable by the actuation from said controlled output means 16 of said control block, a first and a second contact terminals, 22 and 21 respectively, including a single sensing resistor R27 between themselves and making contact with each other only when said coil is energized, said single sensing resistor being suitably determined to be of resistance practically infinite compared to the resistance of any of said lights.

b. said electrical wire interrupting means comprises connections 161A and 162A made with said second and first contact terminals 21 and 22 of said relay in series with said fuse link at points 161 and 162;

c. said electrical signalling means comprises a primary as well as secondary electrical connections by wiring means between said first contact terminal 22 of said relay and a primary and secondary inputs 12 and 13 of the sensing input means of said control block, (using simply the configuration of the microcontroller of FIG. 11 ), and a tertiary electrical connection by wiring means between one of the general classes of transducer means of the states of said ignition switch of said vehicle and a tertiary input 14 of the sensing input means of said control block;

d. whereby, when said light switch 3 is in the OFF position, said primary input would sense a logic high; when said light switch is in the PARK or HEAD positions, said primary input would sense a logic low; said tertiary input, being independent from the states of said light switch, would sense a logic level when said ignition switch is in the STOP mode and would sense a distinctly different logic level when said ignition switch is in the RUN mode, thus, in combination with the memory means of said control block, would provide the necessary information on the present and past states of the position of said light switch and of the mode of said ignition switch;

e. whereby, when said relay coil K27 is energized, the energizing of said vehicle head and park lights in conjunction with said light switch would take place exactly as if there were no modifications made for the invention;

f. whereby, when said relay coil K27 is de-energized, the flow of current in said head and park lights, regardless of the position of said light switch, would be reduced to zero or to a predetermined small level limited by said single sensing resistor R27 of said relay, drawing only energy from said vehicle battery in a manner which would not be detrimental to the normal operation of said vehicle thereafter.

Figure 17:
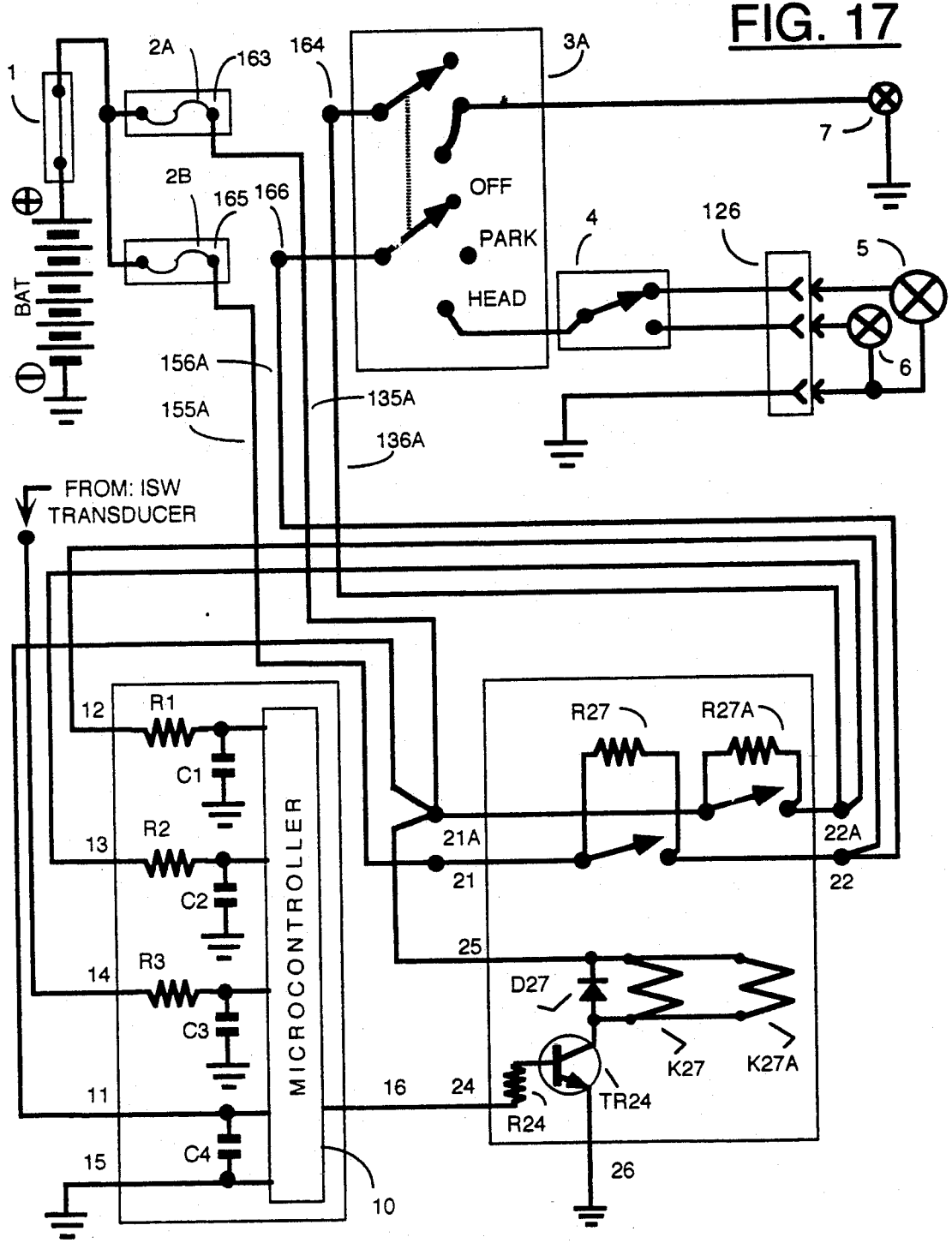
FIG. 17 represents a preferred wiring diagram to be designed into cars being manufactured that contains originally the diagram of FIG. 2.

Here again, if there is the presence of a flash-to-pass switch on the vehicle, it still would not modify the above discussion for the diagram of FIG. 16.

Where the wiring environment permits, the circuit diagram of FIG. 17 represents the most preferred embodiment of the invention to be added onto the previously designed wiring for a lighting system similar to that illustrated by FIG. 2, of a new vehicle being assembled at the factory. The vehicle includes in this case a readily available opportunity to design insertions into the electrical paths energizing the lights of said vehicle as shown in the schematic diagram of FIG. 17. Comparing this diagram of FIG. 17 around the electrical points 163, 164, 165 and 166 and that of FIG. 2, it can be seen that the insertions for the wire interrupting means of the invention can be made on the car assembly line for electrical wire bundles with extra wire re-routings physically just immediately after the easily identified specific fuse 2A and dedicated fuse 2B which are to protect the energizing paths for the park and head lights, respectively. As can be seen clearly in FIG. 17, points 163 and 164, instead of being connected together by probably soldering as originally, would be connected to wires 135A and 136A, respectively. Similarly, points 165 and 166, instead of being connected together by probably soldering as originally, would be connected to wires 155A and 156A, respectively. For the rest of FIG. 17 it can be seen as follows:

a. said electrical wire interrupting means comprises connections made with said second and first contact terminals, 21 and 22, of said relay in series with said dedicated fuse 2B, and connections made with said third and fourth contact terminals, 21A and 22A, of said relay in series with said specific fuse 2A;

b. said electrical signalling means comprises a primary electrical connection by wiring means between said first contact terminal 22 of said relay and a primary input 12 of the sensing input means of said control block, a secondary electrical connection by wiring means between said fourth contact terminal 22A of said relay and a secondary input 13 of the sensing input means of said control block, and a tertiary electrical connection by wiring means between one of the general classes of transducer means of the states of said ignition switch of said vehicle and a tertiary input of the sensing input means of said control block;

c. whereby, when said light switch 3A is in the OFF position, said primary input would sense a logic high and said secondary input would sense a logic high; when said light switch is in the PARK position, said primary input would sense a logic high and said secondary input would sense a logic low; when said light switch is in the HEAD position, said primary input would sense a logic low and said secondary input would sense a logic low; said tertiary input, being independent from the states of said light switch, would sense a logic level when said ignition switch is in the STOP mode and would sense a distinctly different logic level when said ignition switch is in the RUN mode, thus, in combination with the memory means of said control block, would provide the necessary information on the present and at least on the most recent past states of the position of said light switch and of the mode of said ignition switch;

d. whereby, when said relay coil (consisting of K27 and K27A in parallel in FIG. 17) is energized, the energizing of said vehicle head and park lights in conjunction with said light switch would take place exactly as if there were no modifications made for the invention;

e. whereby, when said relay coil is de-energized, the flow of current in said head and park lights, regardless of the position of said light switch, would be reduced to zero or to predetermined small levels limited by a combination of said first and second sensing resistors R27 and R27A of said relay, drawing only energy from said vehicle battery in a manner which would not be detrimental to the normal operation of said vehicle thereafter.

Figure 18:
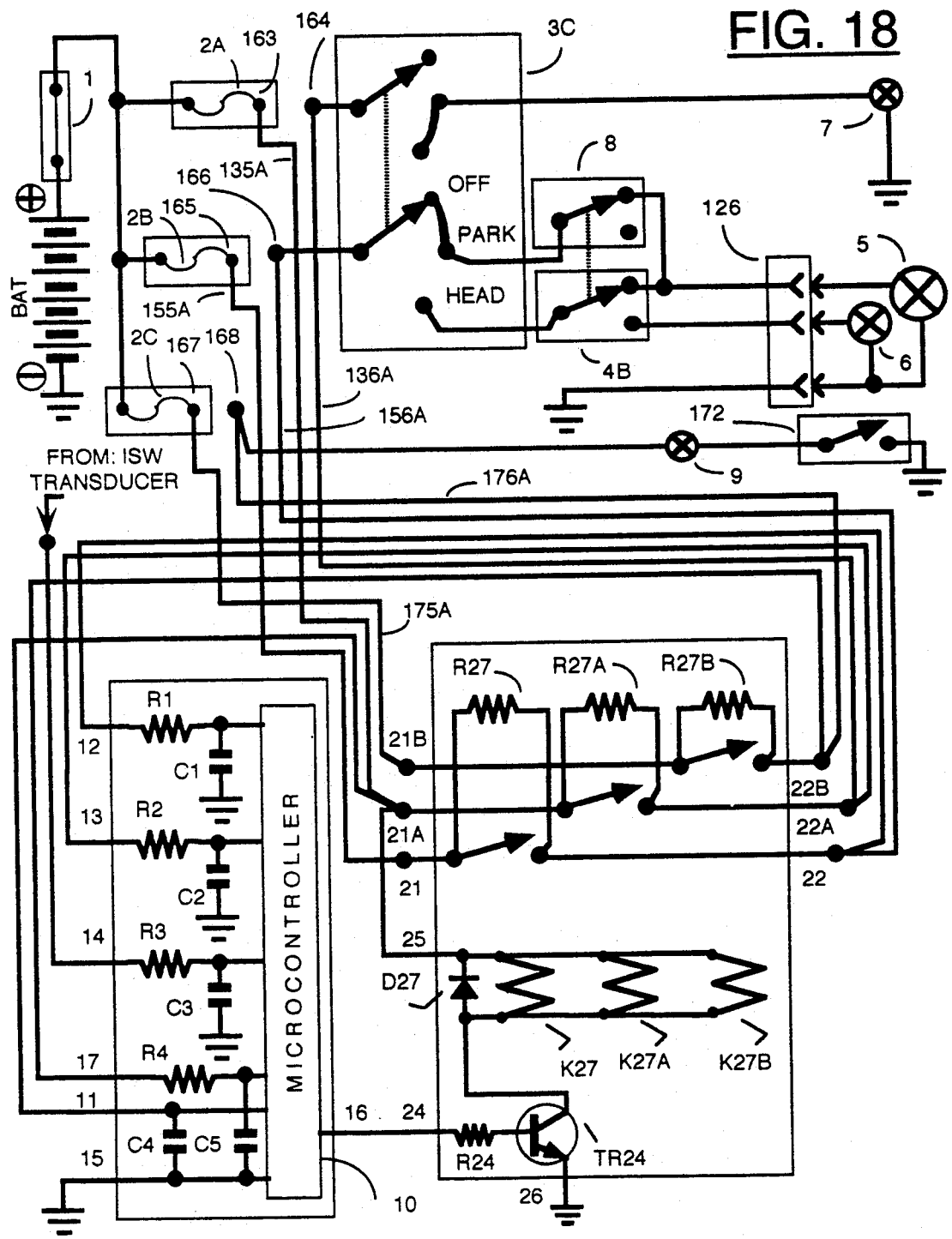
FIG. 18 shows all the circuit of FIG. 17 plus the inclusion of the flash-to-pass switch and the automatic switching circuit for the dome light.

It is obvious that if a flash-to-pass switch is included in the diagram of FIG. 17, it would not change at all the just above discussion about that embodiment of the invention. If automatic switching for the dome light is desirable, it is very easy to make a similar insertion near the dome light fuse 2C. FIG. 18 shows all the circuit of FIG. 17 plus the inclusion of the flash-to-pass switch and the automatic switching circuit for the dome light. The two points of insertion for the dome light fuse 2C are labelled 167 and 168 here and the wires attached to them are labelled 175A and 176A, to be connected to contact terminals 21B and 22B of the controlled switch means, respectively. Substituting wires 135, 136, 155, 156, 175 and 176 of FIG. 15B with wires 135A, 136A, 155A, 156A, 175A and 176A of FIG. 18, would make all the wire interrupting and wire signalling means discussed for FIG. 15B to apply directly to the counterparts of FIG. 18. In this case of FIG. 18, it is very desirable that the ignition switch transducer (ISW transducer) be narrowed down to a simple soldering connection to a terminal of an accessory fuse, as all the parts of the embodiment of the invention may be housed in a suitable container conveniently located near the fuse compartment of the vehicle.

The algorithm and apparatus presented in this invention are extremely general and applicable to a great majority of automobiles manufactured around the world, and are not limited to the examples illustrated herein. With the flexibility in accepting any polarity of logic (high or low) at the sensing input means of the control block and the versatility of inserting the electrical wire insert means, the electrical wire interrupting means and wire signalling means practically anywhere in the paths that energize the lights, it is evident that the wiring of the invention apparatus can be adapted easily to the prior art environment of FIG. 3, where the switching of the park and head lights is made through the ground lines instead of the high potential lines as described at several places above. It can be seen by anyone well versed in the art that for retrofitting without having to cut and splice any pre-installed wires nor having to reach to terminals on the bodies of light switches or ignition switch, it would be easiest, in the environment of FIG. 3, to use three fuse socket inserts (as described above), in conjunction with the three fuses 2CA, 2BA, and 2AA for wire insert means and electric wire interrupting means, an accessory fuse insert (as described above), for ignition switch transducer means, and three sensing resistors across the six contact terminals of a normally-open, triple-pole, single-throw relay, which would be the controlled switch means, as the transducer means for the states of the light switch. Beyond the basic retrofitting for the wiring environment of FIG. 3, if the automatic switching for dome light is desirable, an additional pair of relay contact terminal and its coil, as well as an additional dome-light fuse socket insert would be needed. Even when a flash-to-pass switch is included in the wiring environment of FIG. 3, simple analysis of the wiring circuit similar to the discussion above would determined exactly the correct logic levels to be used for programming the sensing inputs of the microcontroller of the control block of the invention. When opportunity to design insertions into the electrical paths energizing the lights in the environment of FIG. 3 is available, a single insertion immediately after fuse link 1 for wire interrupting and signalling means or three insertions immediately after fuses 2CA, 2BA and 2AA can be decided upon. Then, a convenient ignition switch transducer can be picked among the general classes of transducer means for the ignition switch described above.

The perspective illustrations of the head light socket insert and the fuse socket inserts in FIGS. 12 to 14 are for the sockets which are by far the most popular among the modern items. A survey of all types of sockets from around the world shows that socket inserts matching the male terminals and female receptacles means adopted originally for all head light sockets and all fuse sockets can be easily derived from the discussion for the most popular ones.

It is also evident that the invention apparatus, with suitable inversion of logic and polarity on different components where necessary, can be adapted easily to the group of automobiles wherein the conventional positive terminal of the battery is connected to the metal chassis of the automobile and serves as the common ground potential. This battery connection is simply the reverse of the connection depicted in all the drawings of this description, the latter connection being by far the most popular among all the automobiles manufactured around the world.

The microcontroller algorithm routines in the accompanying program listings illustrate an implementation, on a preferred type of microcontroller chip, of the foregoing control block logic of the invention, that includes the logic for said short-moment routine, said extended-period routine, and said extra-extended routine. Those skilled in the art will recognize that the embodiments of the invention disclosed herein are exemplary in nature and that various modifications can be made therein without departing from the scope and the spirit of the invention. For example, it is clear that the embodiment depicted in FIG. 16 with only three electrical wires to be processed can be installed at low cost to be used on a multitude of models of cars originally made with lighting circuits as in FIG. 1, FIG. 2, FIG. 3, or their variations, as long as the people doing the installation can identify with certitude, (easily if the car is relatively new), the fusing link protecting tile lighting circuit. This embodiment is to be fastened onto the metal chassis under the hood of the car; two of these electrical wires are to be spliced in series with the fusing link wire; and the third is the wire connection means to be attached to an electrical terminal of the ignition coil, which is usually visible under the hood of many popular cars. For this embodiment, all conventional operations of the light switch are substantially preserved, and most of the desirable improvements in automatic switching of all the lights protected by this fusing link are provided, namely, one-minute, ten-minute, and hundred-minute time delay operations. A minor complication to remember with this embodiment involves the hundred-minute time delay operations: a sequence, for example, STOP RUN STOP, of the ignition switch has to be executed for a hundred-minute delay operation, and the slight risk of leaving all the head and park lights on for a hundred minutes if the light switch is turned to the HEAD position in these operations. The approximate time interval between each of two modes STOP and RUN of this sequence can be made easily to time itself after the first part STOP RUN STOP of the sequence is executed, by modifications in the preprogramming of the microcontroller. These modifications will relieve the user of the vehicle of the anxiety about this time interval in the above sequences as it will be taken care of automatically now, but the mentioned slight risk is still there. It will be clear also, from examining the algorithm routines, that in the environment for the invention where the positions HEAD and PARK can be logically transduced separately as in all the embodiments except the one depicted in FIG. 16, the proprogramming of the microcontroller can be easily modified so that a virtually foolproof embodiment of the invention can be provided by getting rid of the slight risk mentioned above. In this ultimate embodiment of tile invention, it would be predetermined by preprogramming and separate light switch transducing, that the continuously-on and the one-minute time delay operations are permitted for all HEAD and PARK positions; only the sequence of HEAD position of the light switch after STOP mode of the ignition switch would automatically lead into the ten-minute time delay operation; and only the sequence of PARK position of the light switch after STOP mode of the ignition switch would automatically lead into the one-hundred-minute time delay operation. If the dome lights are to be switched automatically also, then they can be predetermined to operate in time delay operations just like the park lights. Thus, there is nothing unusual, such as the sequence STOP RUN STOP of the ignition switch, to remember in the most frequent and useful operations of the light switch in using the vehicle having this invention embodiment. It is clear also that as long as a gas-motored, diesel-motored, steam-motored or electric-motored automobile has electric lighting and an enabling system controlled by an enabling switch or ignition switch for enabling or disabling the mechanical powering means of said automobile, this invention can be put to use thereon to provide battery protection and time delay lighting operations as discussed above.

While the above description contains many specificities, it is to be understood that the present invention is not confined to the particular embodiments set forth herein as illustrative, but embraces such modified forms thereof as come within the scope of the following claims.

What I claim is:

1. An attachment for automatic light switching on a vehicle that has as existing equipment the following:
   (a) a battery with one polarity connected to said vehicle metal chassis defined as ground potential and the other polarity defined as high potential,
   (b) basic lights comprising a set of head lights electrically connected preferably in parallel and a set of park lights electrically connected preferably in parallel;
   (c) an enabling system, also called the ignition system, for the user of said vehicle to enable or disable the mechanical powering means of said vehicle which, when enabled, would move said whole vehicle a predetermined way when a predetermined electromechanical action is met;
   (d) a path energizing said set of head lights when closed, a path energizing said set of park lights when closed, and a path energizing said ignition system when closed, each of said paths being connected in series with said battery;
   (e) a light switch having a plurality of electrical terminals thereon and three positions operating in conventional manners: an OFF position that by itself would interrupt both the closed path that energizes said sets of head lights and the closed path that energizes said sets of park lights, a PARK position that by itself would close the path that energizes said set of park lights, and a HEAD position that by itself would close both the path that energizes said set of head lights and the path that energizes said set of park lights; and
   (f) an ignition switch having a plurality of electrical terminals thereon, a STOP mode that would interrupt the enabling electrical connections of said ignition system, and a RUN mode that would close said enabling electrical connections;

said attachment for automatic light switching comprising, in combination:
   (a) a control block including a suitable number of electrical pins, having each practically infinite internal electrical resistance, assigned by programming as sensing input means to gather at predetermined intervals of time the logical states of devices electrically connected thereto; a suitable number of electrical pins assigned by programming as controlled output means to actuate, when energized, other devices electrically connected thereto; and logical processing means including memory means preprogrammed to decide when to energize and when to de-energize said controlled output means according to the combinations and sequences of the logical states of devices electrically connected to said sensing input means;
   (b) controlled switch means having a predetermined number of pairs of contact terminals and electrically connected to and actuatable by said controlled output means for changing the electrical resistance through each of all said pairs of contact terminals of said controlled switch means from a practically infinite value to a practically zero value, and vice versa;

(c) powering means using preferably said battery to energize said control block and eventually to energize said controlled switch means on actuation from said control block;

(d) a light switch transducer means for providing on demand from said control block, the logical state of at least one of said three positions of said light switch, said light switch transducer means including electrical transducer means providing two logical states out of the energizing and de-energizing of each particular one of a predetermined number of closed paths electrically interruptible by a particular one of said three positions of said light switch, said electrical transducer means being made by electrically connecting each of the two electrical terminals of a sensing resistor of predetermined electrical resistance to each of the two electrical contact terminals of the particular pair of contact terminals of said controlled switch means which is electrically connected in series with said particular one of a predetermined number of closed paths electrically interruptible by a particular one of said three positions of said light switch and then sensing with an electrical connection to said sensing input means of said control block, the change in voltage, with respect to said ground potential, at a predetermined one of said two electrical terminals of said sensing resistor; said change in voltage being caused by the closing and interrupting of said particular one of said three positions of said light switch and said change in voltage being sensed only when the resistance through said particular pair of contact terminals of said controlled switch means is made into a practically infinite value;

(e) an ignition switch transducer means for providing the logical state, presence or absence, of the STOP mode of said ignition switch;

(f) electrical wire insert means, each interrupting and creating each of pairs of insulated electrical terminals in series in each of a predetermined number of closed paths of said basic lights, anywhere on each of said closed paths of said basic lights;

(g) electrical wire interrupting means connected to a predetermined number of said pairs of insulated electrical terminals of said insert means as well as to a predetermined number of said pairs of contact terminals of said controlled switch means to allow each pair of contact terminals of said controlled switch means to be inserted in series with each of said predetermined number of energizing closed paths of said basic lights at convenient locations, said convenient locations being predetermined for said vehicle, and not restricted electrically to a single definite location with respect to said battery, said light switch, and said basic lights; and (h) electrical wire signaling means connected to said transducer means of said light and ignition switches as well as to said sensing input means to provide to said logical processing means the combinations and sequences of the logical states of said light and ignition switches, said transducer means of said light and ignition switches being predetermined to be the most convenient on said vehicle.

2. An attachment for automatic light switching as in claim 1 wherein said light switch transducer means includes electronic transducer means providing two logical states out of the energizing and de-energizing of a particular one of a predetermined number of closed paths electrically interruptible by a particular one of said three positions of said light switch, said electronic transducer means being made by electrically connected each of the two electrical terminals of a low-resistance resistor of predetermined electrical resistance in series with the particular pair of contact terminals of said controlled switch means which is electrically connected in series with said particular one of a predetermined number of closed paths electrically interruptible by a particular one of said three positions of said light switch and then sensing with said sensing input means of said control block at the output of an electronic differential amplifier the change in voltage between the two inputs of said electronic differential amplifier connected electrically across the two electrical terminals of said low-resistance resistor, said change in voltage being caused by the closing and interrupting of said particular one of said three positions of said light switch, and said change in voltage being sensed only when the resistance through said particular pair of contact terminals of said controlled switch means is made into a practically zero value.

3. An attachment for automatic light switching as in claim 1 wherein said vehicle further includes as existing equipment a resetable circuit breaker protecting said path energizing said set of head lights when closed and a specific fuse protecting said path energizing said set of park lights when closed, and wherein said electrical wire insert means include a predetermined number of head light socket insert means and a predetermined number of fuse socket insert means.

4. An attachment for automatic light switching as in claim 1 wherein said vehicle further includes as existing equipment a dedicated fuse protecting said path energizing said set of head lights when closed and a specific fuse protecting said path energizing said set of park lights when closed, and wherein said electrical wire insert means include a predetermined number of fuse socket insert means.

5. An attachment for automatic light switching as in claim 1 wherein said vehicle further includes as existing equipment a fusing link to protect both said path energizing said set of head lights when closed and said path energizing said set of park lights when closed, and wherein said electrical wire insert means comprise the operation of cutting a single predetermined electrical wire connected electrically in series with said fusing link and splicing the two wire ends produced by such cutting, serving as one of said pairs of insulated electrical terminals, with two wire ends of said electrical wire interrupting means which electrically connect this one of said pairs of insulated electrical terminals to one pair of said contact terminals of said controlled switch means.

6. An attachment for automatic light switching as in claim 1 wherein said vehicle further includes as existing equipment a dedicated fuse protecting said path energizing said set of head lights when closed and a specific fuse protecting said path energizing said set of park lights when closed, and wherein said electrical wire insert means include the first particular operation of cutting a single predetermined electrical wire connected to and physically located near said dedicated fuse and splicing the two wire ends produced by such cutting, serving as one of said pairs of insulated electrical terminals, with two wire ends of said electrical wire interrupting means which electrically connect this one of said pairs of insulated electrical terminals to one pair of said contact terminals of said controlled switch means, said first particular operation being repeated for said specific fuse if necessary.

7. An attachment for automatic light switching as in claim 1 wherein said vehicle further includes as existing equipment a first designated fuse protecting said path energizing said set of high-beam lights when closed, a second designated fuse protecting said path energizing said set of low-beam lights when closed, and a specific fuse protecting said path energizing said set of park lights when closed; and wherein said electrical wire insert means include a predetermined number of fuse socket insert means.

8. An attachment for automatic light switching as in claim 1 wherein said vehicle further includes as existing equipment a first designated fuse protecting said path energizing said set of high-beam lights when closed, a second designated fuse protecting said path energizing said set of low-beam lights when closed, and a specific fuse protecting said path energizing said set of park lights when closed; and wherein said electrical wire insert means include the second particular operation of cutting a single predetermined electrical wire connected to and physically located near said first designated fuse and splicing the two wire ends produced by such cutting, serving as one of said pairs of insulated electrical terminals, with two wire ends of said electrical wire interrupting means which electrically connect this one of said pairs of insulated electrical terminals to one pair of said contact terminals of said controlled switch means, said second particular operation being repeated for said second designated fuse and said specific fuse if necessary.

9. An attachment for automatic light switching as in claim 3 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said predetermined number of fuse socket insert means includes the fuse socket insert for said dome fuse and wherein said light switch transducer means includes electrically connecting each of the two electrical terminals of a dome sensing resistor of predetermined electrical resistance to each of the two designated electrical contact terminals of the pair of contact terminals of said controlled switch means which is electrically connected in series with the closed path electrically interruptible by all of said dome switches being open at the same time and then sensing, while said designated electrical contact terminals are non-conducting, with an electrical connection to said sensing input means of said control block the change in voltage with respect to said ground potential at a predetermined one of said two electrical terminals of said dome sensing resistor, said change in voltage being caused by the closing and interrupting of said path energizing said set of dome lights by said set of dome switches.

10. An attachment for automatic light switching as in claim 4 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said predetermined number of fuse socket insert means includes the fuse socket insert for said dome fuse and wherein said light switch transducer means includes electrically connecting each of the two electrical terminals of a dome sensing resistor of predetermined electrical resistance to each of the two designated electrical contact terminals of the pair of contact terminals of said controlled switch means which is electrically connected in series with the closed path electrically interruptible by all of said dome switches being open at the same time and then sensing, while said designated electrical contact tern-finals are non-conducting, with an electrical connection to said sensing input means of said control block the change in voltage with respect to said ground potential at a predetermined one of said two electrical terminals of said dome sensing resistor, said change in voltage being caused by the closing and interrupting of said path energizing said set of dome lights by said set of dome switches.

11. An attachment for automatic light switching as in claim 6 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said rifts particular operation is repeated for said dome fuse, and wherein said light switch transducer means includes electrically connecting each of the two electrical terminals of a dome sensing resistor of predetermined electrical resistance to each of the two designated electrical contact terminals of the pair of contact terminals of said controlled switch means which is electrically connected in series with the closed path electrically interruptible by all of said dome switches being open at the same time and then sensing, while said designated electrical contact terminals are non-conducting, with an electrical connection to said sensing input means of said control block the change in voltage with respect to said ground potential at a predetermined one of said two electrical terminals of said dome sensing resistor, said change in voltage being caused by the closing and interrupting of said path energizing said set of dome lights by said set of dome switches.

12. An attachment for automatic light switching as in claim 7 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said predetermined number of fuse socket insert means includes the fuse socket insert for said dome fuse and wherein said light switch transducer means includes electrically connecting each of the two electrical terminals of a dome sensing resistor of predetermined electrical resistance to each of the two designated electrical contact terminals of the pair of contact terminals of said controlled switch means which is electrically connected in series with the closed path electrically interruptible by all of said dome switches being open at the same time and then sensing, while said designated electrical contact terminals are non-conducting, with an electrical connection to said sensing input means of said control block the change in voltage with respect to said ground potential at a predetermined one of said two electrical terminals of said dome sensing resistor, said change in voltage being caused by the closing and interrupting of said path energizing said set of dome lights by said set of dome switches.

13. An attachment for automatic light switching as in claim 8 wherein said vehicle further includes as existing equipment a set of dome lights, a set of dome switches electrically connected in parallel and located physically at predetermined locations on said vehicle and a dome fuse protecting said path energizing said set of dome lights when closed by any of said set of dome switches, and wherein said second particular operation is repeated for said dome fuse, and wherein said light switch transducer means includes electrically connecting each of the two electrical terminals of a dome sensing resistor of predetermined electrical resistance to each of the two designated electrical contact terminals of the pair of contact terminals of said controlled switch means which is electrically connected in series with the closed path electrically interruptible by all of said dome switches being open at the same time and then sensing, while said designated electrical contact terminals are non-conducting, with an electrical connection to said sensing input means of said control block the change in voltage with respect to said ground potential at a predetermined one of said two electrical terminals of said dome sensing resistor, said change in voltage being caused by the closing and interrupting of said path energizing said set of dome lights by said set of dome switches.

* * * * *